US009250794B2

(12) United States Patent
Suarez Rovere

(10) Patent No.: US 9,250,794 B2
(45) Date of Patent: Feb. 2, 2016

(54) METHOD AND APPARATUS FOR TIME-VARYING TOMOGRAPHIC TOUCH IMAGING AND INTERACTIVE SYSTEM USING SAME

(71) Applicant: Victor Manuel Suarez Rovere, Ciudad de Buenos Aires (AR)

(72) Inventor: Victor Manuel Suarez Rovere, Ciudad de Buenos Aires (AR)

( * ) Notice: Subject to any disclaimer, the term of this patent is extended or adjusted under 35 U.S.C. 154(b) by 15 days.

(21) Appl. No.: 13/748,388

(22) Filed: Jan. 23, 2013

(65) Prior Publication Data

US 2013/0307795 A1 Nov. 21, 2013

Related U.S. Application Data

(60) Provisional application No. 61/589,762, filed on Jan. 23, 2012.

(51) Int. Cl.
*G06F 3/0488* (2013.01)
*G06F 3/041* (2006.01)
*G06F 3/042* (2006.01)

(52) U.S. Cl.
CPC .............. *G06F 3/0488* (2013.01); *G06F 3/042* (2013.01); *G06F 3/0416* (2013.01); *G06F 2203/04104* (2013.01); *G06F 2203/04109* (2013.01)

(58) Field of Classification Search
CPC ....... G06F 2/041; G06F 2/042; G06F 2/0423; G06F 2203/04109
USPC .................................................. 345/173–177
See application file for complete search history.

(56) References Cited

U.S. PATENT DOCUMENTS

| 5,841,890 | A | 11/1998 | Kraske |
| 6,351,548 | B1 | 2/2002 | Basu et al. |
| 7,215,730 | B2 | 5/2007 | Kalke et al. |
| 7,227,980 | B2 | 6/2007 | Gines |
| 7,840,053 | B2 | 11/2010 | Liao |
| 8,077,153 | B2 | 12/2011 | Benko et al. |
| 8,531,435 | B2 * | 9/2013 | Drumm ......................... 345/175 |
| 8,692,807 | B2 * | 4/2014 | Fohraeus et al. .............. 345/175 |

(Continued)

FOREIGN PATENT DOCUMENTS

WO        2006095320  A2        9/2006

OTHER PUBLICATIONS

Conjugate Gradient Method Wikipedia Article As edited in Dec. 20, 2011 http://en.wikipedia.org/w/index.php?title=Conjugate_gradient_method&oldid=466909391.

(Continued)

*Primary Examiner* — Dorothy Harris
(74) *Attorney, Agent, or Firm* — Mesmer & Deleault PLLC

(57) ABSTRACT

An interactive touchscreen system comprising a conductive panel having a surface portion adapted to receive touch interactions, the conductive panel operatively coupled to a tomograph configured for determining conductivity of the conductive panel and further adapted for incrementally improving a reconstructed tomogram estimation by integrating the output of a tomographic reconstruction algorithm having as input a unreconstructed tomogram delta, the reconstructed tomogram estimation being representative of the panel conductivity properties at locations spatially correlated to a plurality of regions notionally defined over the surface portion and therefrom indicative of the touch interactions, the tomograph further processing and outputting said reconstructed tomogram estimation and an indication thereof.

20 Claims, 15 Drawing Sheets

(56) References Cited

U.S. PATENT DOCUMENTS

| | | |
|---|---|---|
| 8,792,700 B2 | 7/2014 | Riddell et al. |
| 8,867,803 B2 | 10/2014 | Seibel et al. |
| 2004/0252091 A1 | 12/2004 | Ma et al. |
| 2006/0227120 A1 | 10/2006 | Eikman |
| 2009/0153519 A1* | 6/2009 | Suarez Rovere ............ 345/173 |
| 2010/0246920 A1 | 9/2010 | Vaswani |
| 2012/0114207 A1 | 5/2012 | Riddell et al. |
| 2012/0196320 A1 | 8/2012 | Seibel et al. |
| 2013/0249833 A1* | 9/2013 | Christiansson et al. ...... 345/173 |
| 2014/0002400 A1* | 1/2014 | Christiansson et al. ...... 345/173 |
| 2014/0342395 A1 | 11/2014 | Seibel |

OTHER PUBLICATIONS

Xiaolu Zheng, University of Texas as Austin, Dissertation, "Realtime computed tomographic reconstruction" Sec. 4.3 (Aug. 1995).

* cited by examiner

METHOD AND APPARATUS FOR TIME-VARYING TOMOGRAPHIC TOUCH IMAGING AND INTERACTIVE SYSTEM USING SAME

CROSS-REFERENCE TO RELATED APPLICATIONS

This application claims the priority and benefit of previously filed U.S. Provisional Application No. 61/589,762 filed on Jan. 23, 2012, in the name of Victor Manuel Suarez Rovere, which is here incorporated by reference in its entirety.

BACKGROUND OF THE INVENTION

1. Field of the Invention

This invention relates to a method and apparatus for tomographic touch imaging sensor and interactive system using same. More particularly, the invention relates to a method and apparatus for touch sensitive devices for computing systems or for controlling actions of associated devices or equipment, and still more particularly, to devices that detect and/or process simultaneously multiple touch interactions (by fingers or other objects) at distinct locations on a touch-sensitive surface.

2. Prior Related Art

Many types of input devices are presently available for performing operations in a computing system, such as buttons or keys, mice, trackballs, touch panels, joysticks, touch screens and the like. Touch screens, in particular, are becoming increasingly popular because of the ease and versatility of operation, as well as, their declining price. Touch screens can include a touch panel, which can be a clear panel with a touch-sensitive surface. The touch panel can be positioned in front of a display screen so that the touch-sensitive surface covers the viewable area of the display screen. Touch screens can allow a user to make selections and move a cursor by simply touching the display screen via a finger or stylus. In general, the touch screen can recognize the touch and position of the touch on the display screen, and the computing system can interpret the touch and thereafter perform an action based on the touch event.

One limitation of many conventional touch panel technologies is that they are only capable of reporting a single point or touch event, even when multiple objects simultaneously come into contact with the sensing surface. That is, they lack the ability to track multiple points of contact at the same time. Thus, even when two points are touched, these conventional devices can only identify a single location, which is typically the average between the two contacts (e.g. a conventional touchpad on a notebook computer provides such functionality). This single-point identification is a function of the way these devices provide a value representative of the touch point, which is generally by providing an average resistance or capacitance value.

Another limitation of most touch panels is that, besides being incapable of reporting a plurality of touch points that occurs simultaneously, is that they provide information about just touch coordinates. Most known touch panels cannot provide a complete representation of the details of all shapes contacting the panel, because the methods of detection often include just triangulation of touch points. Thus, a need exists for providing a better and fuller representation of touch interactions. The present invention proposes to provide a method and apparatus for achieving, for example, by providing a pixilated image representative of all the touch areas and their shapes. This ability of providing a full representation of all touch interactions is sometimes called "true-touch".

A further limitation of some touch panels involving tomographic techniques, is that for the determination of the touch interactions they spend quite the same computing resources calculating the tomographic reconstruction for the touch determination for every possible touch interaction, not taking into account similarities between interactions that occurs close in time and that permits to execute quite optimized algorithm adapted to those similar in time situations.

SUMMARY OF THE INVENTION

Accordingly, it is a principal object of my invention to provide a method and apparatus for time-varying tomographic touch imaging and interactive system using same, especially for computing systems but also usable to control actions of other devices, and still more particularly, to devices that detect and/or process simultaneously multiple touch interactions (by fingers or other objects) at distinct locations on a touch-sensitive surface.

The foregoing is accomplished by combining in a unique way, a touch panel with a tomograph optimized for time-varying signals that appears as result of touch interactions of a frequent kind, and by using this combination as a touch imaging sensor and/or as an interactive system in a computer system.

The present invention applies techniques from tomography field of science, but instead of using it for medical purposes, the tomographic techniques are used for making a computer input device. Specifically, the input device is a touch device capable of multi-touch operations, oriented to control the forthcoming new generation of software applications that propose a new paradigm for Human Computer Interaction.

Since tomography is used to determine inner information from the borders of a panel, and because invisible signals are used, it is possible to make a transparent touch panel with almost perfect light transmission properties. The transparent properties make the touch sensor useful to work with a display, as a touch screen. Other such input devices need to put complex elements on a panel that obstruct vision. As these other such input devices need to have at least some transparency, but not 100%, this requirement makes it difficult to manufacture, affecting costs.

The present invention can be implemented with a very clear and homogeneous material, like a simple sheet of acrylic. Also, because the panel can be very thin, a slim and small system including a flat display can be made, thus enabling the system to be portable.

Several objects and advantages of my invention are listed as follows.

a) To provide a device that is sensitive to touch and able to detect objects when they are making a subtle pressure. If the object touching is a finger of an user the invention can provide a tactile feedback. This is in contrast to proximity sensors which can be activated when the user isn't touching anything.

b) To provide a touch sensitive device that can provide a digital representation of nearly all areas where there is a touch interaction available. This is in contrast to devices that provide location information of just a few touch interactions simultaneously.

c) To provide a touch sensitive device that can be thin, thus having a large relative surface area with respect to volume.

d) To provide a touch sensitive device that can have a transparent touch panel so that it can include a display visible through the panel.

e) To provide a touch sensitive device that can be interactive by providing output information related to touch interactions.

f) To provide a thin touch sensitive device that can be flat, or non-planar (e.g. domed) in 3-dimensional space.

g) To provide, in some embodiments, a touch sensitive device that can detect a zero-pressure contact.

h) To provide, in some embodiments, a touch sensitive device that can discriminate regarding more than one level of pressure on possible different touch interactions that occurs simultaneously.

i) To provide, in some embodiments, a touch sensitive device that can be robust to some external unwanted interfering signals.

j) To provide, in some embodiments, a touch sensitive device that can have a transparent touch area of quite low absorption with respect to visible light, useful to make the power requirements of a possibly attached display less demanding.

k) To provide, in some embodiments, a touch sensitive device that can be constructed with elements relatively easy to manufacture.

l) To provide a touch sensitive device that's efficient in tomographically processing time-varying signals that appears as result of touch interactions of a frequent kind.

Further object and advantages of my invention will become apparent from the following detailed description of preferred embodiments of the invention when taken in conjunction with the appended drawings.

DETAILED DESCRIPTION OF PREFERRED EMBODIMENTS OF THE INVENTION

Figure 1A:
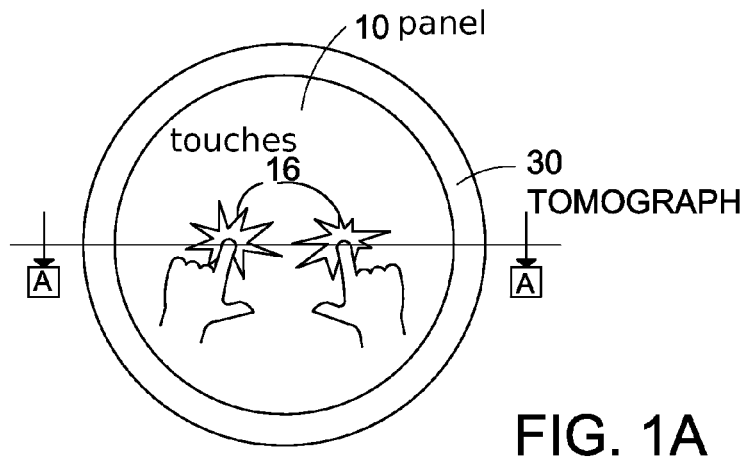
FIGS. 1A and 1B show, respectively, a top view of the basic tomographic touch device of the present invention, and a cross sectional view taken along line A-A of FIG. 1A.
Figure 1B:
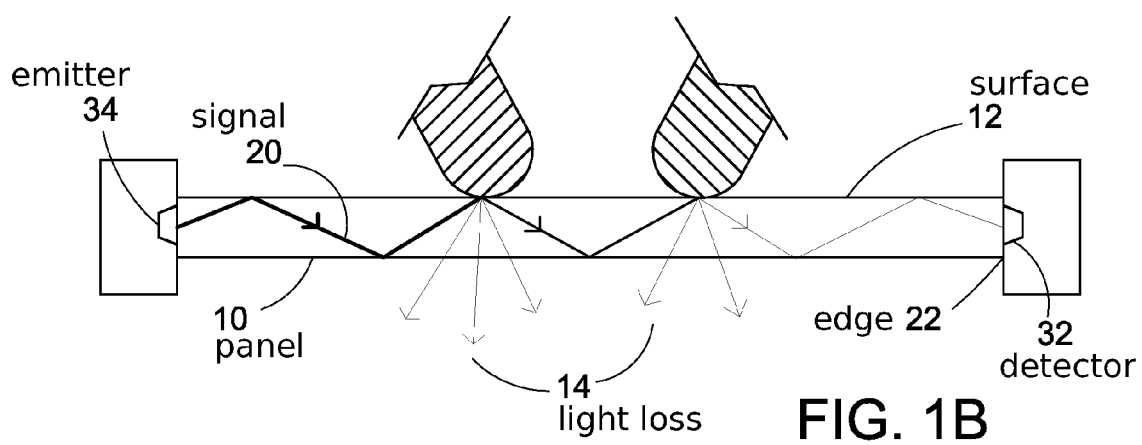

Referring now to the drawings, and particularly to the embodiment of the present invention, a touch device is illustrated in FIG. 1A (top view) and FIG. 1B (cross sectional view). The touch device, as shown, consists of a thin, flat, circular panel 10 of light conductive material, such as a suitable plastic material known for this purpose. The panel 10, due to its properties is adapted to conduct signals, introduced into the borders of the panel, through the panel. The panel can be opaque or transparent and can be rigid or flexible. The panel can also be resilient and/or compressible. The signals may be any radiation or wave energy that can pass through the panel from border to border or edge to edge including without limitation, light waves in the visible or infra-red or ultraviolet regions of the spectrum, electrical energy, electromagnetic or magnetic energy, or sonic and ultrasonic energy or vibration energy.

In the following description, light passing through the panel will be described as a preferred embodiment. The light signals 20 are introduced through the edge or border 22 of the panel 10, as shown in FIG. 1B. The shape of the panel 10 is not limited to any particular shape and may be irregular or regular, such as, circular, elliptical, square, rectangular or polygonal. The panel has a refraction index greater than air so it can act as a waveguide by the effect of TIR (Total Internal Reflection). Touch interactions at discrete locations on the panel surface 12 can interfere with, disrupt or frustrate the TIR effect so that a portion of the signal (light) is lost by escaping the waveguide of the panel. This is indicated in FIG. 1B by the reference numeral 14 showing the light exiting form the panel, i.e. light loss. Thus, the light conductive properties of the panel are altered in those places where the touch interactions occurs, as indicated by reference numeral 16 in FIG. 1A.

Surrounding the conductive panel 10, there is an optical tomograph optimized for time-varying signals 30. In the context of the present invention, "tomograph" means, as usually defined, a device that can image from the borders. The tomograph is controlled to emit light signals 20 by light emitters 34, through signal flow ports, which also detects light signals by detectors 32.

The term "signal flow port" refers to both emitters and receivers (detectors), and the signal flow port physically acts either as emitter or receiver. For example, an electrode in the electrical part of the embodiment can be a unique device that could serve both purposes emitter and/or receiver. Also an optoelectronic device like a LED can be used as a detector, although with less performance. So a signal flow port here isn't anything material and thus, isn't either an element that can house an emitter or detector. In the context of this invention, a signal flow port is a term used to refer interchangeably to an emitter, or to a detector, or to a device that may accomplish both roles. Thus, the port houses an emitter and/or detector and may be virtual or real.

Figure 1C:
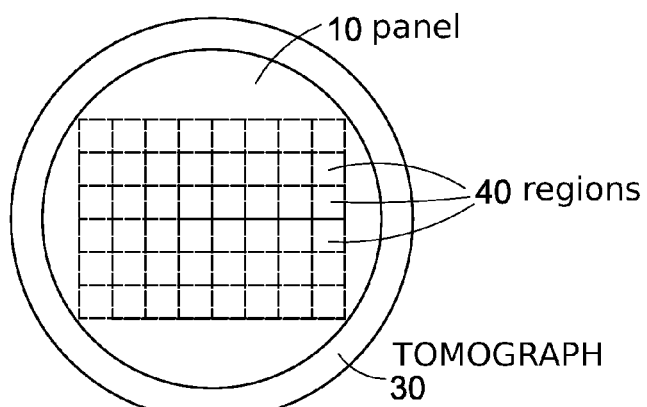
FIG. 1C shows selected imaginary or notional regions or areas of the touch panel shown in FIGS. 1A and 1B illustrating where touch interactions may occur or be estimated.

The signal flow ports (emitters and detectors) are positioned at the edge 22 of the panel 10. The light signals 20 introduced into the panel 10 by emitters 34 at their associated signal flow ports penetrate or pass through the panel 10, in the manner described, and are detected by detectors 32 at their associated signal flow ports after circulating or passing through the panel 10. The tomograph 30 generates a tomogram representative of the panel conductivity, which is a two dimensional representation of the calculated or estimated conductivity on many imaginary or notional regions 40 defined on the panel surface 12, as shown by the array on FIG. 1C (top view). The resulting tomogram is thus a calculation or an estimative representation of the touch interactions, including its shapes and details. The tomogram may be calculated to represent the conductivity change produced by touch interactions, by comparing it with the conductive properties of the panel when no touch interactions occur. The resulting tomogram can be provided as digital information aimed to control or operate a digital device. The digital device may include an output device, such as a display, and a processing element to transform the tomogram and provide output to a user as feedback of touch interactions, thus forming an interactive device.

Figure 2:
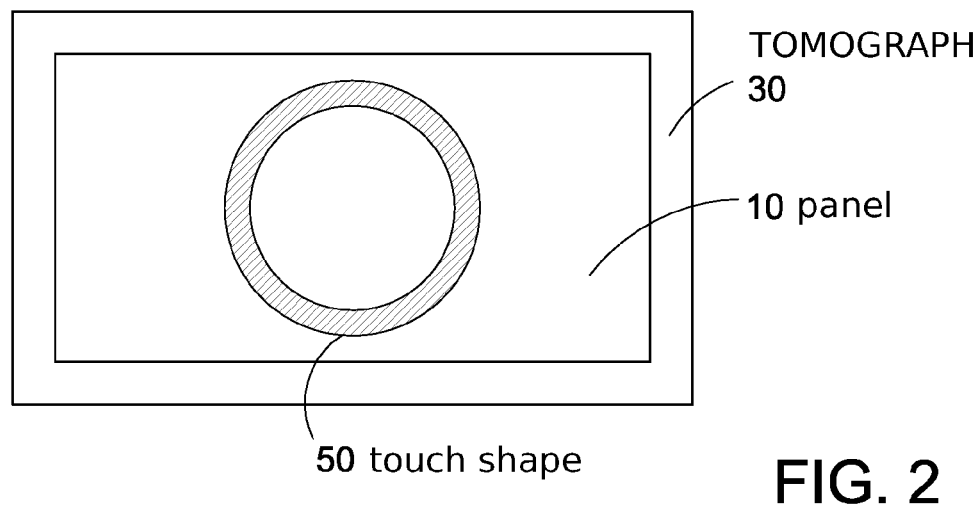
FIG. 2 shows an annular shape representing a particular "test" touch interaction made on a rectangular touch panel.

An exemplary shape 50 of an interesting and quite challenging touch interaction is shown on FIG. 2 (top view). Shown is an annular shape that could be an approximation of the contact area produced by the palm of a hand touching a rectangular touch panel. As will be appreciated, the resulting tomograph can represent any complex figure or shape depending on the touching interactions. As a parallelism with medical X-ray tomography, the annular shape shown could be an approximation of the cross section of a hollow bone. It will be appreciated that CT or computerized tomography is a well known technology and is understood by those of ordinary skill in the art.

Figure 3:
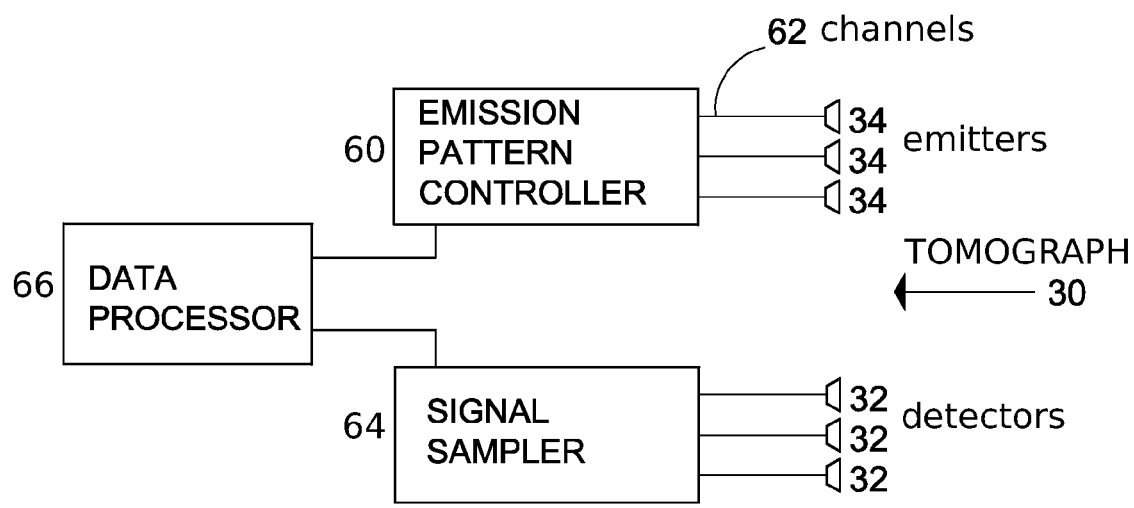
FIG. 3 shows components of a typical tomograph as used in the present invention.
Figure 7:
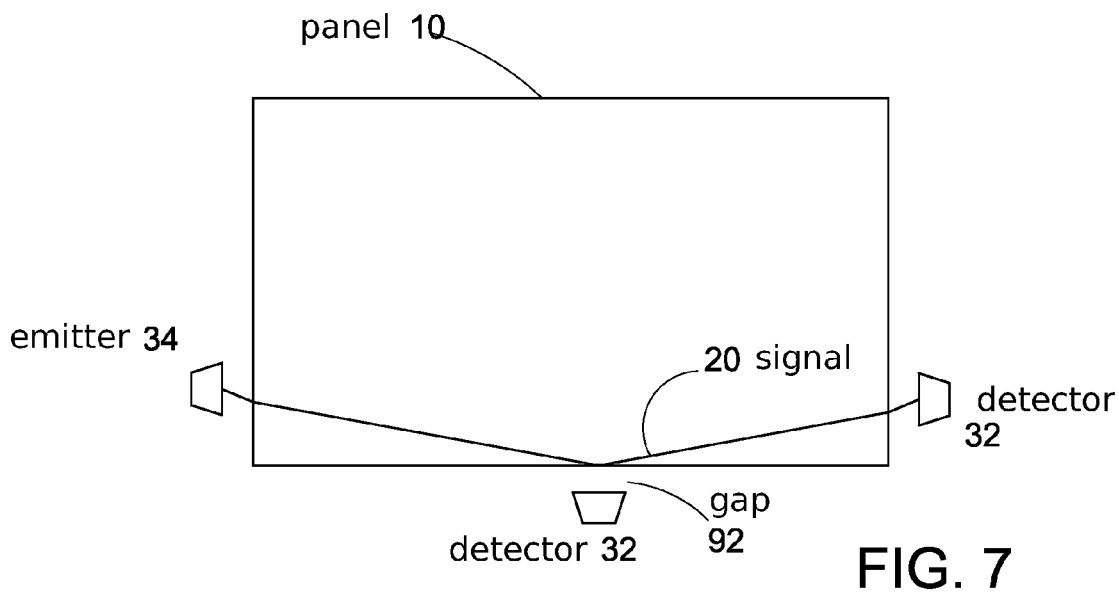
FIG. 7 shows an embodiment of the present invention that uses just an air gap to optically couple emitters and detectors to a panel, and the effect of signal reflection on a panel's edge.

The tomograph 30 of the touch device as illustrated on FIG. 3 may typically comprise a set of signal flow ports 18. Each signal port may be an emitter and/or a detector for the signals, where the signal flows through the port. An emitter 34 is typically an electronic device, for example an IR LED (Infrared Light Emitting Diode) or other light emitting device. A detector 32 is typically an electronic device, such as a phototransistor, photodiode, Charge Coupled Device (CCD) and other like devices. The signal flow ports are typically located around the periphery or perimeter (edges 22) of the conductive panel 10 and spaced apart, usually at regular intervals. The emitters 34 are optically coupled to the panel, in a way that at least a portion of the emitted signal penetrates the conductive panel 10 and circulates or passes through by effect of TIR. The detectors 32 are optically coupled to the panel 10 in a way that each detector 32 receives the emission signals 20 emanating from one or more of the emitters 34 via signal flow ports 18. The ports may be coupled to the conductive panel by via a coupling object that may be optical glue, or just direct contact, or a waveguide like an optical fiber, a diffuser or just an air gap, or by any other known means provided the light from the emitters 34 is introduced properly into the panel 10 and the light is detected by the detectors 32. Although by using an air gap 92, see FIG. 7, total reflections could occur on the border of a polished panel, before reaching a detector close to the point of reflection, as shown in FIG. 7, anyways the reflected signal may approach another detector, thus tomographic reconstruction still could be accomplished.

The tomograph 30 also includes an emission pattern controller 60 operatively coupled to each emitter 34, for example, using any conventional set of communication channels 62, shown in FIG. 3 as wires. The tomograph 30 further includes a signal sampler 64 operatively coupled to each detector 34. Also the tomograph 30 includes a data processor 66 operatively coupled to the pattern controller 60, and to the signal sampler 64.

The emission pattern controller 60 can energize, upon requirement or according to any predetermined program, any desired combination or set of said emitters 34. Each emitter 34 can be energized at any desired emission level of at least two possible values. The configuration of a set of emitters and its levels defines an emission pattern. A representative emission pattern, according to the invention, can be to have one determinate or preselected emitter 34 active while leaving the rest inactive, and then serially process through the emitters 34, one at a time.

The signal sampler 64 can measure, upon requirement or according to any predetermined program, the signal level received on each detector 32. A representative signal sampler 64, according to the invention, can have one or more Analog to Digital Converters (ADC) and also may have one or more analog and/or digital multiplexers.

The data processor 66 can be incorporated in any known computer system, and is adapted to command the emission pattern controller 60 to energize the emitters 34 using a desired sequence of patterns. Also the emission pattern controller 60 and/or signal sampler 64 may function based on a determinate or preselected program, without being commanded by the data processor, for example a digital logic circuit.

By operating the emission pattern controller 60 and the signal sampler 64, an unreconstructed tomograph can be acquired.

Figure 8:
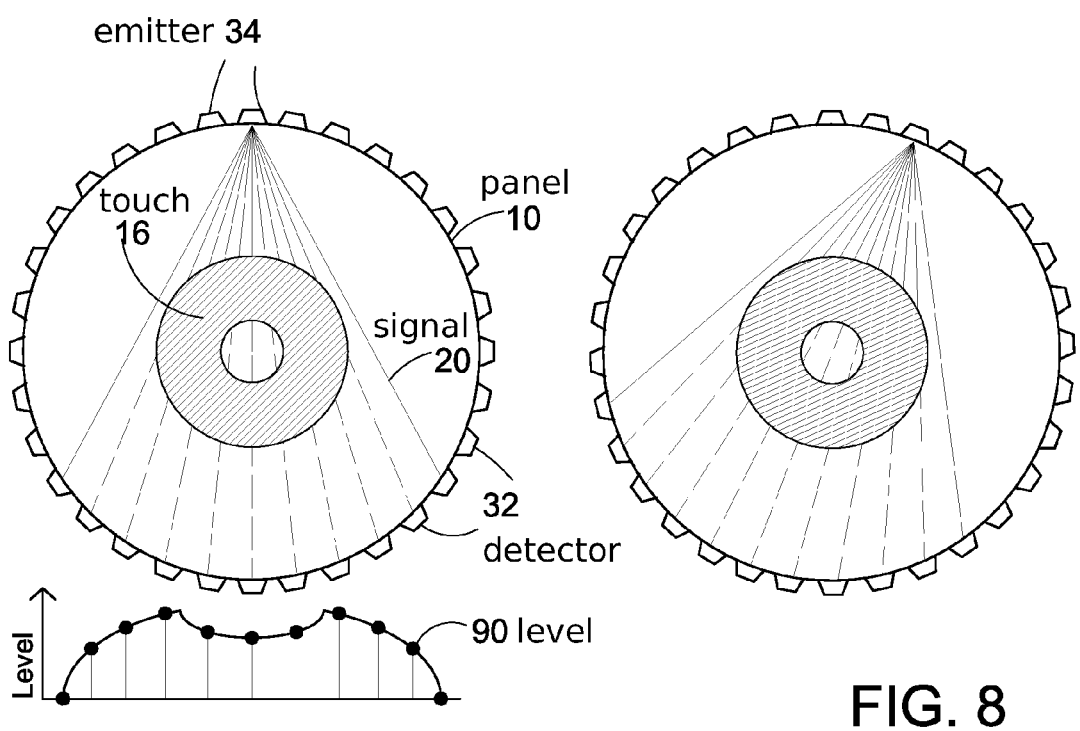
FIG. 8 shows two typical emission patterns and its associated detectors, and the signal alteration level measured on each detector after passing through an annular phantom.

To operate emission controller 60, a set of emission patterns has to be defined, for example, a sequence of patterns may be to activate, in turn or serially, different emitters 34. Each emission pattern is active at different times, forming a sequence. While each emission pattern is in effect, an associated set of detectors 32 have to be defined to measure the effects of the active emissions. Then, the data processor 66 acquires from the signal sampler 64, the measured values from the associated set of detectors 32, the set being typically all or a substantial subset of the detector 32. The measured values form part of the unreconstructed tomogram. Thus after applying all emission patterns and obtaining measurements from the detectors, the unreconstructed tomogram is obtained. An example of two emission patterns, its associated detectors, and a representation of the signal alterations, shown in graph of FIG. 8, received for the annular phantom, is shown also in FIG. 4B.

The data processor 66 may be a microcontroller, microprocessor, FPGA (Field Programmable Gate Array), ASIC (Application Specific Integrated Circuit) or special purpose electronic circuit or even part of a complete computer system. Although it may be desirable for the data processor 66 to include a data memory containing a computer program, it is possible to practice the invention performing most computations with just a digital logic circuit. For example, a tomographic reconstruction calculation, as known in the art, can be executed just with an integrated circuit. That integrated circuit can lack a specific "memory", because computation can be hardwired. The invention contemplates a model using a programmable logic circuit (FPGA) that has a memory, but without any "computer program" as such stored in the memory.

In a typical embodiment, the data processor 66 commands the emission pattern controller 60 to activate one determinate emitter 34, then, acquires measurements from all detectors 32, then, repeating these steps serially for the rest of the emitters 34, one by one. Thus, if the number of emitters 34 is $N_e$ and the number of detector ports is $N_d$, a vector of $N_e$ by $N_d$ elements is acquired. One can call this vector the projection vector, or one can call it a measurements vector, or just "b". This acquired vector, not to be confused with a matrix, is sometimes called in the context of Computer Tomography (CT) the "unreconstructed tomogram" or sometimes "sinogram".

Having the unreconstructed tomogram with $N_e$ by $N_d$ potentially independent values, the amount of available information to make reconstruction can be thus in quadratic relation with respect to number of signal flow ports. So the number of potentially independently recognized touch interactions regions can be in accordance to that quadratic relation, and not in linear relation with respect to number of emitters 34 or detectors 32. Thus, that number of potentially discriminated regions can be quite large or big. Hence, the foregoing is a sample of the potential of the present invention of being able to discriminate not just a few simultaneous touch coordinates, but many.

Having the unreconstructed tomogram, a reconstructed tomogram can be calculated by the use of a Tomographic Reconstruction algorithm. The reconstructed tomogram, or just tomogram, is the representation of the features of the tomographed "phantoms", a phantom being a particular "test" or "active" touch interaction.

In a tomographic reconstruction algorithm, a linear or non-linear model of the tomographic system may be used to transform the unreconstructed tomogram. If a linear model is chosen, the system may be modeled by matrix equations and solved by linear matrix operations in a known manner.

A typical equation used to model tomographic systems is Ax=b, where A corresponds to the "system matrix", as is sometimes called, x corresponds to the reconstructed tomogram and is a vector that represents the regions conductivity values, not to be confused with a matrix just because regions are usually a grid. The variable b is the unreconstructed tomogram, a vector containing the measured projection values reaching the detectors 32 for each emission pattern. The system matrix, in the context of CT, represents the transformation that the typical linear tomograph system accomplishes to generate the projection data. A typical linear tomograph thus works by transforming b into x taking into account matrix A as a transformation operator.

To be able to calculate a two-dimensional tomogram adequately, one needs to have defined appropriate locations to each emitter 34 and detector 32, which are typically surrounding the panel 10 on its edge(s). Also, one needs to define imaginary or notional locations and shapes of a set or array of regions 40 on the surface 22 of the panel 10, where an estimation of conductivity is going to be calculated. The regions 40 are sometimes called "reconstruction regions". In a typical embodiment, the regions 40 are rectangular and are disposed next to each other in an appropriate imaginary or notional grid of pixels.

Also, to be able to calculate an adequate tomogram, the regions have to be geometrically defined in a way that each region is affected by more than two non-parallel line integrals; each line integral being defined as the path of an actually measured signal between a determined pair of emitter 34 and detector 32. This is to accomplish, for each region, adequate "angle density" as is usually called. In a diffusion tomograph the concept of line integrals may be geometrically not similar to a line, but to a sort of "field" as shown on FIG. 6A.

A determinate signal corresponding to a line integral may be altered in more than one point of its path without being substantially obstructed by a single touch, as depicted in FIG. 1B. That physical property of the panel with respect to conduction of signals is an important factor determining ability of permitting adequate tomographic reconstruction. For example if the touch interaction substantially would obstruct the signal, and another touch in other part of the signal path wouldn't further alter the signal, the annular phantom as shown on FIG. 2 would be easily confused, by that hypothetic system, with a filled circle, because that system would be unable to adequately estimate the interior properties of the phantom. That property of possible successive alterations of the signal along a line integral, configures an "integral function" as sometimes is called. Also, to be able to adequately measure the possible effects of touches over an emitted signal, measurements by the use of analog to digital conversion techniques are important.

Those skilled in the art will understand that the requirements of high angle density for each region and existence of an integral function to do tomographic reconstruction has support in the Projection Slice Theorem, which is related to the Radon Transform. Basically, the projection-slice theorem tells us that if one had an infinite number of one-dimensional projections of an object taken at an infinite number of angles, one could perfectly reconstruct the original object, f(x,y). Note the need of multiple angles (as much as possible in a non-theoretical device) and the need of "projection" (i.e. integration data) along the line. However, the present invention is not limited by this theorem.

It's well known that a finger interacting with a waveguide like in the presented embodiments makes better and broader optical contact as more pressure is applied. This effect is because, together with other causes, the skin on the fingerprints gets more deformed, so the average contact area per unit area and thus, average conductivity gets altered in a higher level. This higher change of conductivity could be interpreted as more pressure and used to take distinctive actions. For example an icon of a user interface can be selected with a light pressure but activated with more pressure.

Also, as in any measurement instrument, repeated measurements over time can be done to have a time-varying measurement, so taking a series of tomographs over time is useful to determine how touch interactions changes over time, and that information may be used to detect touch events or gestures, with algorithms well known in the art.

Another embodiment of the touch device, utilizing a different algorithm for tomographic reconstruction (let's call it the "improved algorithm") is as follows.

An interactive system based on tomographic techniques, or any tomographic device that calculates a series of time-varying reconstructed tomograms can be improved by using the data associated with previous unreconstructed tomogram data and/or associated with previous reconstructed tomogram data, in order to calculate a subsequent reconstructed tomogram. Let's call "a frame" to the compound data of an unreconstructed tomogram (obtained after the associated acquisition phase), together with its associated reconstructed tomogram (calculated in a particular moment) and other data further associated to the unreconstructed tomogram (note that the "frame" name is inspired on the term used in video processing techniques where a two-dimensional image associated with a particular moment is also called a "frame")

Data for first frame (let's call it f0) in the device tomographic, can be the composed of the first unreconstructed tomogram calculated (let's call it vector f0_sub_b), and, the first reconstructed tomogram calculated by the use of a particular tomographic reconstruction algorithm (let's call it TRA(b), a function of vector b with also vector output) that uses f0_sub_b as at least one of its inputs (let's call this first reconstructed tomogram vector f0_sub_x), so $$f0\_sub\_x := TRA(f0\_sub\_b)$$

(Note: symbol := means assignment)

To calculate next frame (f1) an algorithm can generate another unreconstructed tomogram (f1_sub_b) after acquiring necessary data, and then apply the function TRA over f1_sub_b, so to obtain:

$$f1\_sub\_x := TRA(f1\_sub\_b)$$

but another way of calculating f1_sub_x can be done by reusing data from frame f0. Assuming the function TRA(b) is linear (for example, TRA(b)=A'b, being A' a pseudoinverse of the system matrix of the modeled tomographic system), by the existence of the linear property the calculation can be rewritten as:

$$f1\_sub\_x := TRA(f1\_sub\_b - f0\_sub\_b) + TRA(f0\_sub\_b)$$

This calculation has the following interesting properties: the second term in the sum, TRA(f0_sub_b), is equal to the reconstructed tomogram calculated in previous frame, f0_sub_x, so it can be reused and no additional processing is required to calculate it. As with most tomographic reconstruction algorithms (whose complexity usually don't depend on the data), calculating TRA(f1_sub_b−f0_sub_b) instead of just TRA(f1_sub_b) implies about the same processing time so no significant processing penalty is incurred by executing the algorithm over the subtraction instead of over the data without that subtraction, and overall the economy of computing resources is maintained since vector summation or subtraction is usually cheap in view of the processing time usually incurred by executing tomographic reconstruction algorithms. Indeed, applying the tomographic reconstruction algorithm after that subtraction can be exploited to optimize execution time. For example, if the interaction of the user doesn't change between frame f0 and f1 (and in connection with that it results that f1_sub_b equals f0_sub_b), then the algorithm TRA will operate with 0 as input. A simple optimization in that situation, (let's call that optimized algorithm TRA_sub_1) can be:

$$TRA\_sub\_1(b) = \{0 \text{ if } b=0, TRA(b) \text{ otherwise}\}$$

and thus, by defining the difference between unreconstructed tomograms for frame 1 as:

$$d1 := f1\_sub\_b - f0\_sub\_b$$

it results:

$$f1\_sub\_x := TRA\_sub\_1(d1) + f0\_sub\_x$$

and so this way of calculating the reconstructed tomogram is optimized for the case of unreconstructed tomograms that results equal between frames, a situation that very likely could occur when the interaction over the device is not changing (for example because no interaction is occurring or because the same interaction remains fixed over a period). Since a device with a non-changing interaction can anyways generate different unreconstructed tomogram data after acquisition, by for example existence electrical noise in the sampling device (or other sources of noise), the difference d1 between frames can frequently become nonzero including where the situation is of a fixed interaction. To account for this, a "noise gate" function, let's call it NG(d), can be applied over the subtraction of f1_sub_b−f0_sub_b. So an alternative way of d1 calculation is:

$$d1 := NG(f1\_sub\_b - f0\_sub\_b)$$

The function NG(b) can be defined and implemented in various ways, for example calculating a result vector that depends on the input and a threshold parameter. The way of implementing NG is as usually done for a common noise gate: each element of a determinate index of the result equals the element of the same index of the argument, if the value of that element is above a threshold, or equals zero otherwise In other words, a noise gate can be implemented as is described in this phrase "let pass a signal untouched if above a threshold or else return 0". The threshold can be a predetermined scalar or alternatively can be a vector of values to be associated element-wise with the argument, for example each element of the threshold vector can be set higher or lower in accordance with the noise properties of the system, so the noise gate set values to zero with a predetermined probability as appears in frequent situations.

A method of determining the value the threshold vector could be: first, set the system on a situation of normally occurring unchanging interactions (such as when no user interaction with the device appears), then, determine for each position of the argument to the noise function its associated distribution of values that statistically appear under the situation of unchanging interactions, then associate a threshold value with each of that distribution so the threshold makes let's say 99% (or another selected value) of the values normally appearing under that distribution, remain below that threshold with the chosen probability. In that way under normal noise most of the times the noise gate will be setting the argument values to zero and so subtle interactions above normal noise will pass unchanged and be normally used in part of the tomographic reconstruction calculation.

By the use of a noise gate, the vector d1 can be converted or defined of "sparse" type (sparse means that zero values are expected), and thus the computer operations that use that vector can be optimized. For example, if the operation is a matrix-vector multiplication (such as when calculating x=A'b), the result and/or inner operations can also utilize the expected sparsity and so, more efficient implementations of algorithms can be utilized Any tomographic reconstruction algorithm that benefits of using sparse data can be thus selected and applied, and the efficiency gains provided will benefit the overall efficiency of the interactive device based on tomographic reconstruction algorithms. This optimization is particularly useful when the interactions over the device are a few: for example in a tomographic touch system if just a few of fingers are interacting, most acquired values will be very likely not subject to change (more than normal noise) and thus converted to zero by the noise gate, permitting under most situations large gains, by utilizing the sparsity of the noise-gated unreconstructed tomogram used as input to the tomographic reconstruction algorithm.

As results evident from the teachings here, since a way of calculating the reconstructed tomogram in a efficient way (by reutilizing data from frame f0 to calculate data for frame f1) was shown, that can be extended to calculate a third frame (f2) and subsequent ones. For accomplishing that it suffices to, after calculating a frame and before starting the calculation of the next one, update values of the variables associated with f0 with the calculated data associated with f1 (before repeating the process for each subsequent frame to be calculated), for example as follows:

$f0\_sub\_x := f1\_sub\_x$ $f0\_sub\_b := f0\_sub\_b + d1$

Note the use of the noise-gated vector d1 as part of the previous addition operation instead of just assigning f1_sub_b to f0_sub_b: the objective is to accept new data only if that new data carries enough change but let it unaltered otherwise, since d1 contains zeros for data that didn't changed above a minimum. If the operation instead of using the noise-gated data were just assigning f1_sub_b to f0_sub_b, slowly changing data could be not taken into account and so a significant change that occurred but not in a short amount of time, could be regarded as not changed. Since the proposed operation involves data accumulating over time, the use of integer or fixed-point number representation instead of floating point ones can be convenient since it easier to avoid calculation errors. For example, an operation such as "X:=X−Y" followed by "X:=X+Y" can result in a changed X if utilizing floating point number representation, but it's significantly easier to result in X unchanged by utilizing integers or fixed-point representations.

Another way of selecting new or previous data is, instead of adding to the f0_sub_b vector the d1 vector, to update the entries of the f0_sub_b vector with the corresponding entries of the f1_sub_1 vector for each corresponding index where the d1 vector resulted nonzero.

A way of implementing the improved algorithm is as the following pseudocode:

```
f0_sub_x := 0
f0_sub_b := 0
repeat
  f1_sub_b := aqcuire_unreconstructed_tomogram( )
  d1 := NG(f1_sub_b − f0_sub_b)
  f1_sub_x := TRA(d1) + f0_sub_x
  f0_sub_x := f1_sub_x
  f0_sub_b := f0_sub_b + d1
  proccess_and_output_reconstructed_tomogram(f1_sub_x)
end
```

As shown in pseudocode appearing above, the reference to "acquire_unreconstructed_tomogram" represents the steps required to acquire an unreconstructed tomogram in any of the manners suggested, such as operating passing signals through a transparent panel subject to to touch interaction by an user and sampling the signals by analog-to-digital conversion (it should be noted that the reference to a unreconstructed tomogram acquisition contemplates taking measurements from all emitter-detector pairs or from just a selected subset of them); in a similar way the reference to "NG" represents the application of a noise gate in any of the manners suggested such as making zero values below a threshold and generating an sparse vector as result; the reference to "TRA" represents the calculation of a reconstructed tomogram by a tomographic reconstruction algorithm in any of the manners suggested (such as by multiplication with a pseudoinverse of the system matrix); and the reference to "process_and_output_reconstructed_tomogram" represents the further processing of the image-like data in any of the suggested manners such as detecting touch locations by blob detection and tracking and changing accordingly a graphic-user-interface visible by the user through the transparent panel.

As those skilled in the art will readily know, the tomographic reconstruction algorithm that operates over the noise-gated difference data can be implemented utilizing existing techniques for tomographic reconstruction (for example uniform and/or non-uniform Fourier transform techniques, algebraic reconstruction techniques, convolutional methods, backprojection methods, rebinning and/or interpolation techniques for adaptation to geometries like fan-beam or other irregular geometries, or a combination of these and related techniques well-known in the art).

A further optimization that can be part of the improved algorithm, let's call this optimization the "region skipping", is to avoid calculations in association with some reconstruction regions, which are selected in accordance with the following criteria: for each defined reconstruction region, a set of emitter-detector pairs is defined selecting that set of emitter-detector pairs in a way that a interaction of a defined minimum level on that region will significantly alter the signals associated with that set of emitter-detector (for example the set involves a first emitter-detector pair that is positioned in one of the imaginary vertical lines crossing the reconstruction region and a second emitter-detector pair that is positioned in one of the imaginary horizontal lines crossing the same reconstruction region).

Since an interaction of at least a defined minimum level occurring on that region would measurably affect all the signals associated with the selected set of emitter-detector pairs, the lack of significant alteration of the signal associated with at least one of the emitter-detector pairs on the selected set can be interpreted as a complete lack of a significant interaction occurring on that region. To determine when the signal alteration level for a determinate pair is significant or not, thresholds can be utilized in similar way as implemented for the noise-gated difference calculation. Thus once determined that a particular region lacks significant interaction, the tomographic reconstruction calculation for that region can be skipped in order to save processing time, regarding it directly as a region with a "zero-level" interaction.

A way of skipping that tomographic reconstruction calculation for the region, in the case of the reconstruction algorithm involving the pseudoinverse as described, is, to decide at the time of using the pseudoinverse matrix, regard as zero all the elements of the pseudoinverse matrix associated with that region (associated means the matrix element contributes to the calculation of the region), so the pseudoinverse matrix can be converted to a sparse type in order to benefit of an efficient sparse matrix-vector operation such as sparse matrix-vector multiplication. The pseudoinverse matrix can be of integer or fixed-point type for convenience, such as for reducing storage size by truncating least-significant bits. Note that this optimization involving skipping calculations for some reconstruction regions can be combined with the techniques involving noise-gated difference data as also described, and also it is contemplated an implementation where once a region is skipped, corresponding measurements from associated emitter-detector pairs can be also skipped saving time in acquisition (and other resources besides time).

So, the improved algorithm utilizing a noise gate over difference data, optionally including optimization regarding the calculation of a subset of reconstruction regions (as described), can be used as the tomographic reconstruction algorithm of any of the possible embodiments of the present invention. Specifically, the embodiments appearing on this application that calculates the reconstructed tomogram by direct unreconstructed tomogram multiplication with the pseudoinverse of the system matrix (i.e. those embodiments without the noise-gate optimizations and without the region optimization), can be changed to apply the improved algorithm as described, representing in that way a new embodiment for each case. In a similar way, all the references of calculation of data related with the device realization parameters carried "at factory" can be replaced to generate new embodiments for each case, executing the device parameters (instead of at factory), in a calibration step that can done, for example: after device power up or under other "calibration" situations where a particular way of interaction can be expected and taken into account (such as when no interactions occurring, for example when in a user-executed calibration step that ask the user to not-touch the device under calibration).

It's to be noticed that the use of various tomographic reconstruction algorithms are contemplated, for example an "optimized" or "external" one which can make use of an "internal" or "nonoptimized" other (such as being the latter multiplication with a pseudoinverse of the system matrix). Also to be noticed is that various separate and/or combinable techniques are contemplated for optimized tomographic reconstruction calculation, as follows:

A) Optimizations for Unreconstructed Input Data

This is for selecting when new measured values from acquisitions (new as "current" and in contrast to previous) are used to be inputted to any "inner" reconstruction algorithm. Selection criteria is for example by estimating if a change is significant enough with respect with corresponding previous data or if is estimated it will produce corresponding significant changes in reconstruction results, "significant" status being for example according to a distance function such "absolute value of difference being below a threshold" with such difference having as one input data from current unreconstructed tomogram and as second input a value derived from at least a previous unreconstructed tomogram. It's worth to be noted that since any referred measurements are carried with a sampler involving a Analog to Digital Converter (so capable of discriminating lack of touch and many levels of signal alteration due to touch), tiny changes can be detected.

So input data regarded as with "small" changes can be ignored or a previous value assumed as replacement (so acting as a kind of "noise gate"). The threshold can be fixed or adjusted for example for selecting all values that have changed the most so simultaneously discarding the less changed ones, and possibly weighting the changes according to other criteria such as doubly weighting the most vertically associated pairs and the most orthogonal pairs with respect to other pairs. The difference data (for example the current unreconstructed tomogram minus a previous unreconstructed tomogram) can be expressed as a vector with sparsity (making zero) at the location of differences with a "small" value, in order to then applying a "inner" reconstruction algorithm to the difference that can contemplate the sparsity for optimization, for later adding the reconstruction calculation to a previously calculated reconstructed tomogram to be used as output.

B) Optimization for Reconstructed Output Data:

This is for avoiding new calculations of output data such as associated with some reconstruction regions of the reconstructed tomogram. The calculations can be be avoided by applying a criteria by estimating the value that the "inner" reconstruction algorithm would produce. For example if "similar" values would be produced with the new input value or with the corresponding previous value, ("similar" according for example to an output distance function such as described above), the calculation for the region can be skipped and a previous value reused instead. For example if a measurement associated with a emitter-detector pair passing a determinate region is at a low distance with respect to same measurement but in a previous time, it can be regarded that the calculated output at that region won't change a lot, so the calculation can be avoided for that region thus ignoring some data from other emitter-detector pairs, by using as the region result the same value as with a previous calculation.

In a similar manner interactions at some regions frequently produces more changes for some of the associated emitter-detector than for others, so the calculation for the region could consider just the more "dominant" pairs and stop calculation by discarding the less dominant pairs until a condition is met, and that condition can be for example the number of pairs already considered, or how little the previous pairs contributed to the result, or how much time was used in calculations (or a logic combination of those conditions). A simple example of the latter is as follows: for calculating a determinate region, start by using as the more dominant pair the one with the most vertically crossing path, followed on dominance by the pair with the most horizontally crossing path, then if the measurement associated with the vertical pair hasn't changed by more than a predefined threshold, the region can be regarded as "not changed" and replaced with a previous calculation for that region, thus saving time ("dominance" can be according to how much a selected "frequent" or "unit" interaction would affect the measurements, such as the horizontally and vertically associated measurements, respectively, or how much a determinate pair at the "frequent" or "unit" interaction alters the reconstruction value by applying an optimized, non-optimized or other preselected reconstruction algorithm).

Alternatively if the vertically associated measurement changed above its associated threshold, then evaluating how much the horizontally associated measurement can be used to decide to stop calculations or continue using measurements from other region's associated pairs. An advantage with the previous example is that for regions whose interaction hasn't changed much, or is estimated that hasn't changed much, the processing can be speed up.

C) Optimizations by Use of "Forward Transforms" Possibly Combined with any of the Other Optimizations:

It's to be noticed that one proposed criteria for using new input data (unreconstructed tomogram from emitter-detector pairs) or using instead previous data, was by comparing values associated with corresponding detectors at a current time and a non-current time (such as a previous time). Another interesting optimization can be carried by involving the results from previous reconstructions in the criteria selecting which new input data to consider.

For example, in the previously described case (that stopped calculations for a region right after the associated vertical and horizontal pairs measurements were involved in the reconstruction calculations), the calculation serves as a rough estimation besides it could have been possibly calculated with more precision if more pairs were involved. These rough calculations for the different regions can be used to "get back" to input by applying to the reconstruction an inverse or inverse-like function (for example if the reconstruction function is a multiplication with the pseudoinverse of the system matrix, the inverse or inverse-like function is an inverse-of-inverse such as simple multiplication with the system matrix, constituting a case of an inverse of the reconstruction algorithm). Let's call this inverse-of-reconstruction function the "forward" function (note the forward function and/or the reconstruction algorithms can be different at different times for example using low-pass filtered and decimated versions of the functions).

Once the forward function is applied to the rough reconstruction data (to obtain let's call the "back-estimate") that back-estimated data can be compared with the input data so to select which input data values are more different to the back-estimated data ("different" criteria in accordance for example to a distance function as previously described), thus being able to apply again any of the reconstruction algorithms suggested, either in its "optimized" form or in their "non-optimized" form.

D) Optimization by Using an "Interlacing" Technique:

Contemplated to be applied alone or in combination with any other optimization described, another technique that can be applied is computation of reconstruction data after partial acquisition of the unreconstructed tomogram. It works by selecting just a subset of the emitter-detector pair measurements for being involved in calculations, assuming the rest as "non-changed", so the criteria for not selecting measurements from some pairs is just based on time instead of needing to compare with previous values as described above. For example, an emitter can be activated and measurements taken from the selected set of corresponding detectors, then a sparse vector is constructed setting sparsity (zero value assumed) at the locations corresponding with the pairs not associated with current emitter, and for the location corresponding with current emitter, the difference with respect to previous and corresponding measurements is calculated. Having selecting this way just a subset of the complete set of emitter-detector pairs, any of the previous optimization aimed at ignoring some values can be carried.

A good advantage is that reconstructions take place more frequently and this way in a real-time system like an interactive touchscreen the sensation of the user is like a more responsive system, so with some resemblance as what interleaving produced in TV displays. Alternatively instead of assuming a non-measured value corresponding to an emitter-detector equal to the previous one, the value can be estimated by for example interpolation, linear predictive coding, Kalman filters and the like estimators.

Figure 5A:
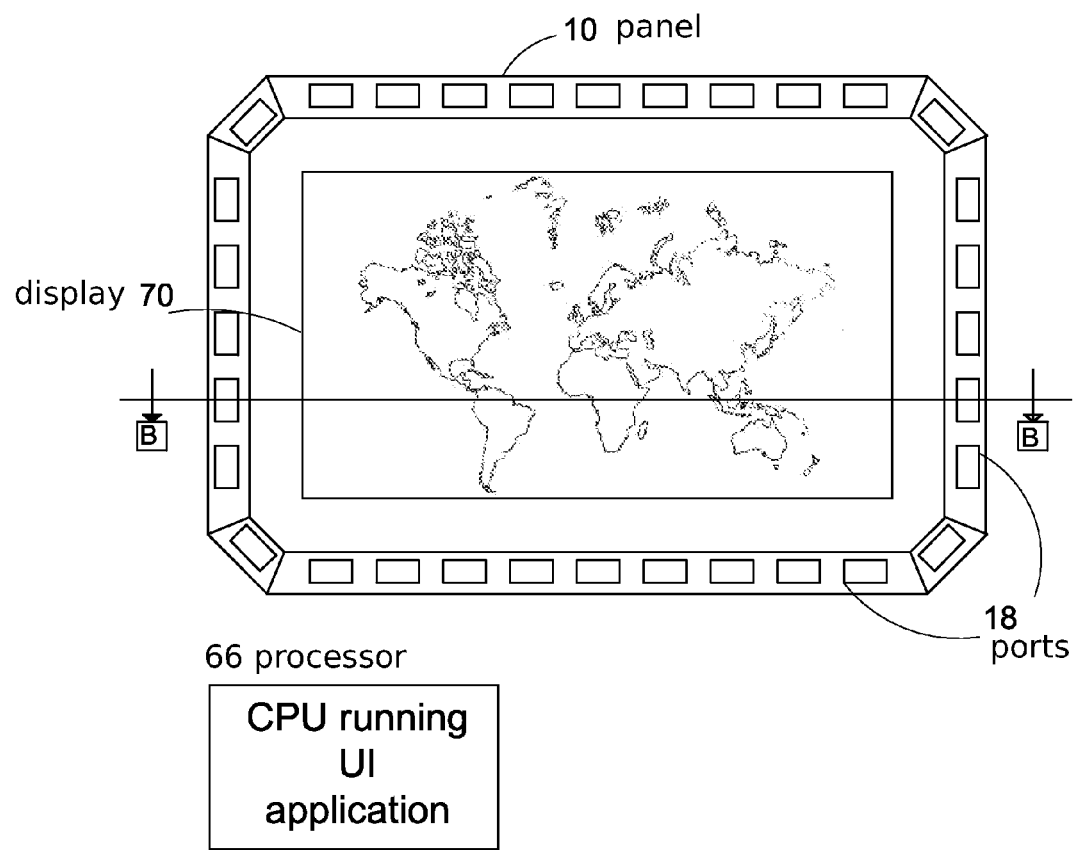
FIGS. 5A and 5B show, respectively, a top plan view and a cross sectional view of a touch device taken along line B-B of FIG. 5A that includes a display and a computer as part of an interactive system according to the present invention.
Figure 5B:
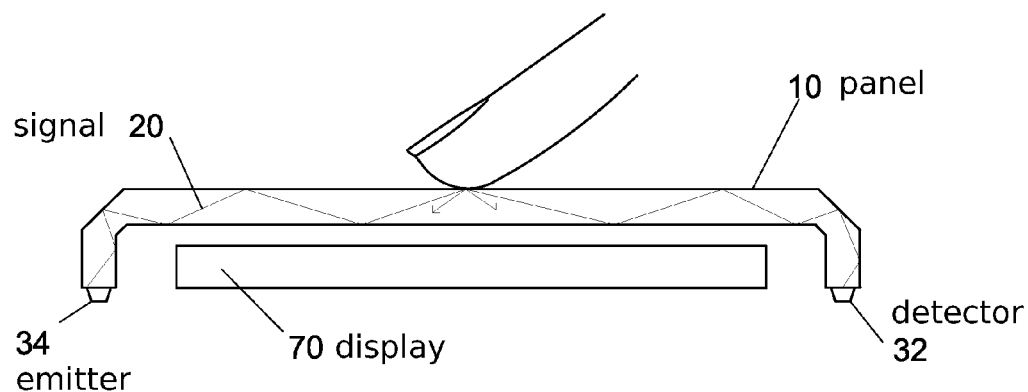

Another embodiment of the touch device, as illustrated in FIGS. 5A and 5B (top plan and cross sectional view, respectively) may include a display 70 beneath the touch panel 10 preferably transparent, to form a touch screen. The touch panel 10 is bent at its edges and the signal flow ports incorporating the emitters 34 and the detectors 32 are arrayed around the bent down perimeter of the device. Light rays 20 pass through the touch screen as described. The touch screen may make available the information related to touch interactions generated by the tomograph, to be interpreted by a digital system, and then the digital system may control the display to show information related to the touch interactions, to be seen through the clear panel. The panel 10 could be convexly curved, and that curved panel could serve to house the display 70 and also to permit the ports to be easily put or mounted on a substrate like a printed circuit board (PCB).

Another embodiment of the touch device, as illustrated on FIG. 5B, may include the output device 70 operatively coupled to the data processor 66 or to an alternative data processor to form an interactive system. The interactive system transforms the tomogram information representative of touch interactions produced by a user, into information to be represented in the output device 70 as feedback to touch interactions. Touch user interactions in the interactive system may be used to modify the state of the software running in the processor, and when the software reflects its modified state in an output device, such as a display, the user receives feedback related to the touch interactions. The typical embodiment of the interactive system may be a cell phone including the touch sensitive area and displaying the images on its user interface.

The transformation of the information representative of touch interactions into information for the output device may be of the type commonly used in Graphical User Interfaces (GUI). For example, the transformation could be to show an icon on the display with an alternative color when a touch interaction event is detected on an area inside the icon, so a user can have the sensation of touching the icon.

The output device 70 may typically be a display such as a Liquid Crystal Display (LCD). A device with a display behind a transparent panel to form an interactive system is one of the main objectives of the invention. However, the touch sensor could be used without a display, for example, just to generate sounds.

The tomograph representative of regions where touch interactions occur may be like a pixilated image representing the conductivity on each region, but an event based GUI may be designed to just accept coordinates of touch interactions or more complex gestures instead of level of activity on determinate regions. So an algorithm to translate activity on each region to coordinates of touch interactions or gestures is useful and contemplated by the invention. The algorithm for determination of touch events often called "Blob Detection and Tracking" and is well known in the art. It is used by some systems that calculate and track touch locations by first using computer vision over an image of the touch regions, and using the image captured with a video camera.

Figure 6A:
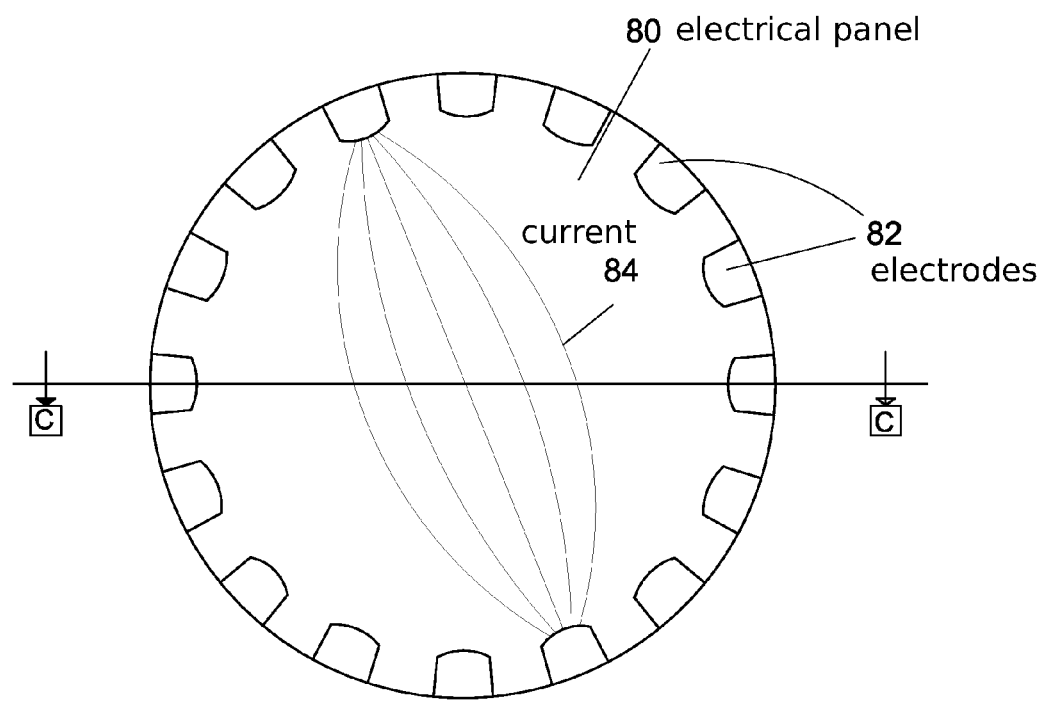
FIGS. 6A to 6B show, respectively, a top view of a similar touch device combined with an electrical impedance tomograph and a cross sectional view taken along line C-C of FIG. 6A.
Figure 6B:
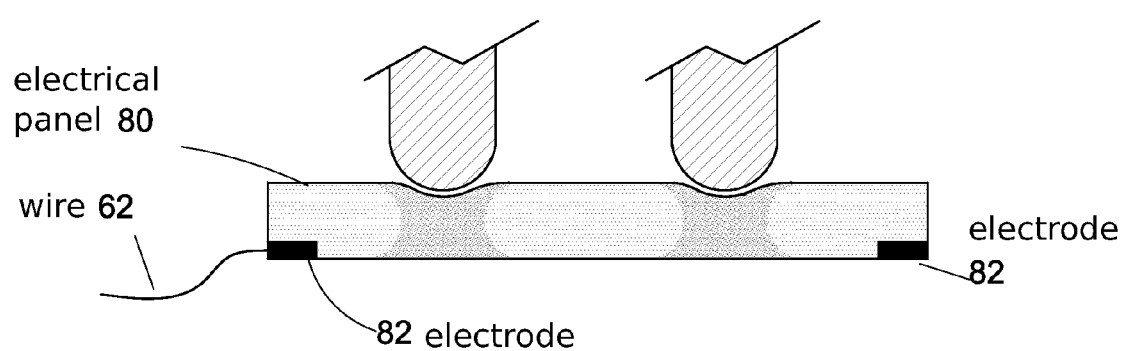

In another embodiment of the touch device according to FIG. 6A (top view) a conductive panel 80 may be rendered electrically conductive using the signal flow ports, which can be simple electrodes 82, and the signals 84 may be electric currents. The electrically conductive panel 80 may be of a material as shown in U.S. Pat. No. 4,448,837, which is conductive and transparent. Another way to implement the electrically conductive panel 80 is by depositing a thin film of transparent conductive material over a non-conductive transparent substrate, so the touch of a finger makes some part of the currents normally circulating on the panel, to circulate through the skin thus lowering the resistance on the contact points. A display is mounted beneath the touch screen as previously described.

In another embodiment of the touch device the panel may be of a material acting as a dielectric, and the tomograph may be a Capacitance Tomograph, where the touch of a finger or other object can alter the dielectric properties of the panel.

In another embodiment of the touch device the panel may be of a material acting as a vibration conducting medium, and the tomograph may have acoustic or piezoelectric transducers as ports, in a similar way as an ultrasonic tomograph for pregnancy is implemented. The acoustic impedance of the panel can be altered by the touch of a finger or other object.

Operation

The operation of the touch screen device included in an embodiment of an interactive device (the method of the invention) is shown in the flow chart of FIG. 9 and is described as follows.

Figure 9:
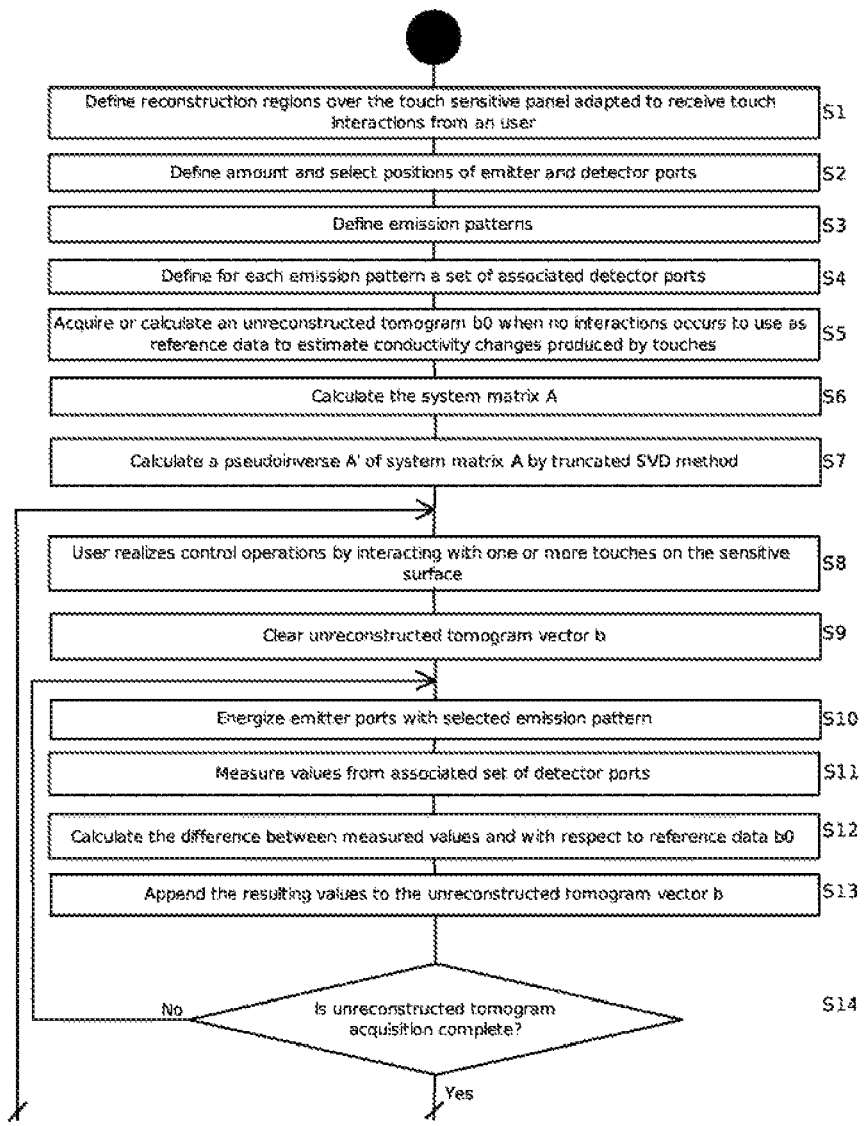
FIG. 9 illustrates a flowchart of the operation of an embodiment of the touch device as part of an interactive system.
Figure 9:
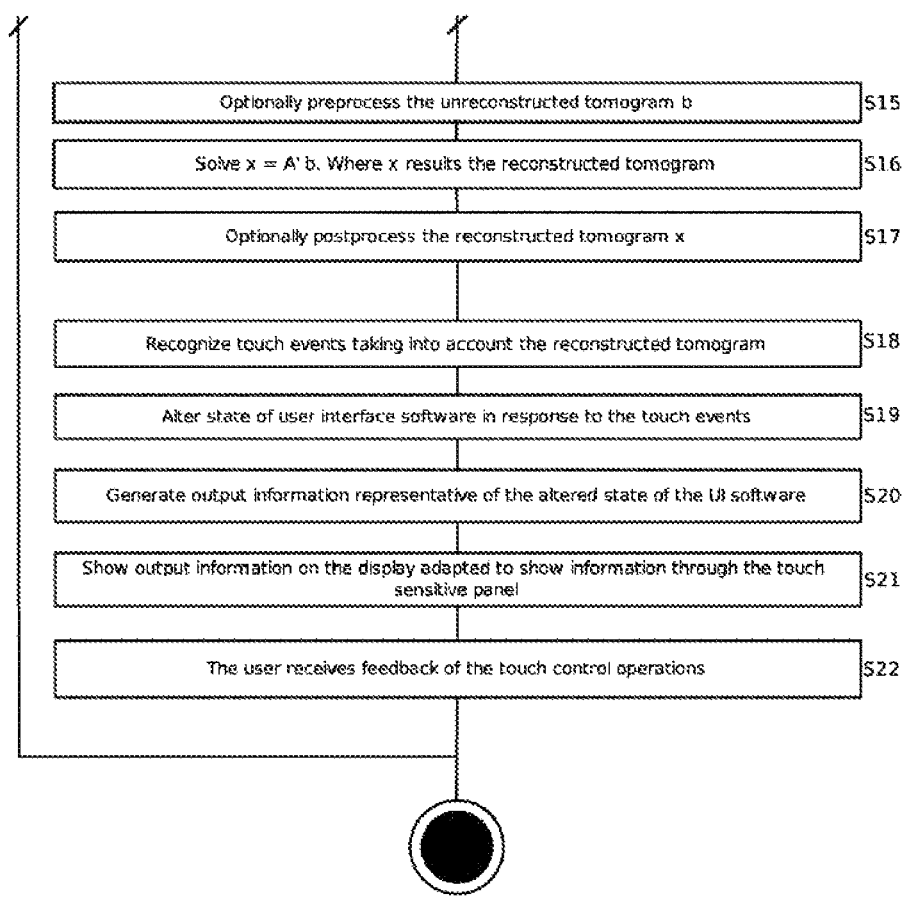

Steps S1 to S7 carried out as described in the blocks of FIG. 9 define and calculate parameters for posterior tomograph acquisition and reconstruction. These parameters can be calculated during the interactive operation of the system or device, or optionally the information can be calculated and stored in memory for later recall.

Steps S8 to S22 carried out as described in the blocks of FIG. 9 are a group of steps that repeats indefinitely while a user is interacting with the interactive device. Steps S9 to S14 obtain an unreconstructed tomogram; steps S15 to S17 calculate a reconstructed tomogram representative of detected or sensed touch interactions. This is carried out by a suitable algorithm as detailed in the blocks of FIG. 9 for achieving tomographic reconstruction, but other well known algorithms for tomographic reconstruction can be used. Some of these algorithms are well explained in the book "Principles of Computerized Tomographic Imaging" by Kak and Slaney, available on the web.

Step S18 to S22 are carried out as described in the blocks in FIG. 9 for processing touch information to control an application and provide feedback to the user.

Step S1 is for defining positions and shapes of the imaginary or notional reconstruction regions over the sensitive surface. The regions forms typically a pixilated grid but each region can have its own shape, that can be polygonal, or inclusive defining a surface of more than one disjoint shape.

Step S2 is for defining the set of emission and detector ports to be involved in unreconstructed tomogram acquisition, and also for selecting its positions. The port positions may be typically the surroundings of the sensitive panel, for example alternating an emitter with a detector at regular intervals. Also, the positions may be near just some portions of the panel's surroundings, for example on just a subset of edges of a polygonal panel. Where there are not ports, the panel may have reflective materials so signals can bounce there (be reflected) and reach other ports.

Figure 4A:
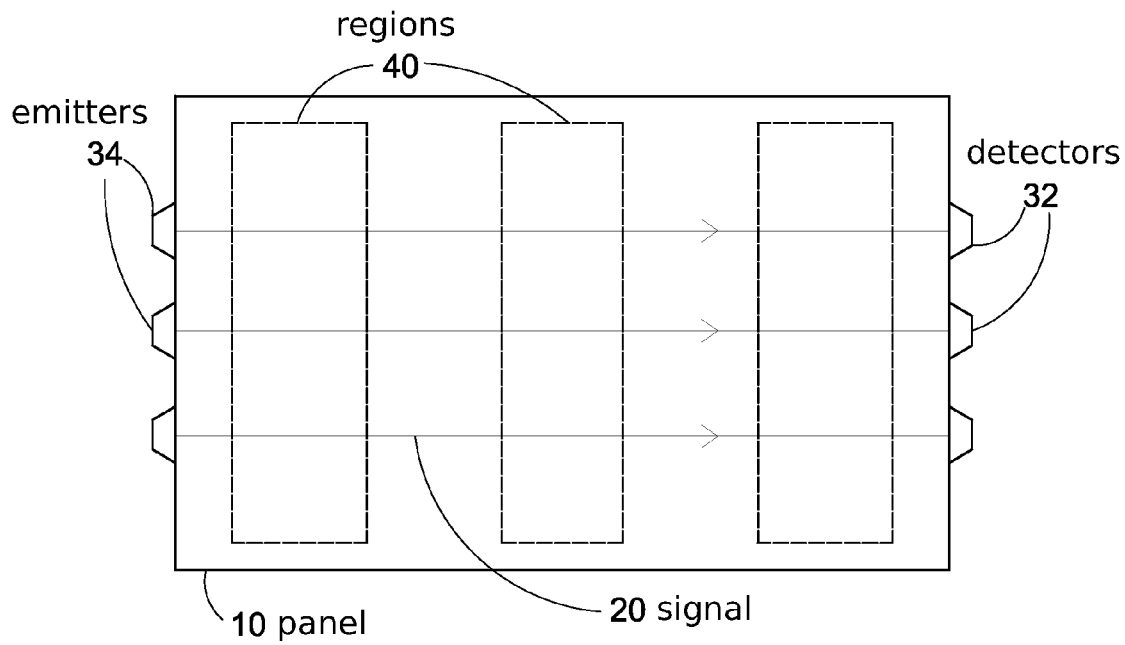
FIG. 4A shows one simple way of defining geometries for the tomography apparatus according to the invention.
Figure 4B:
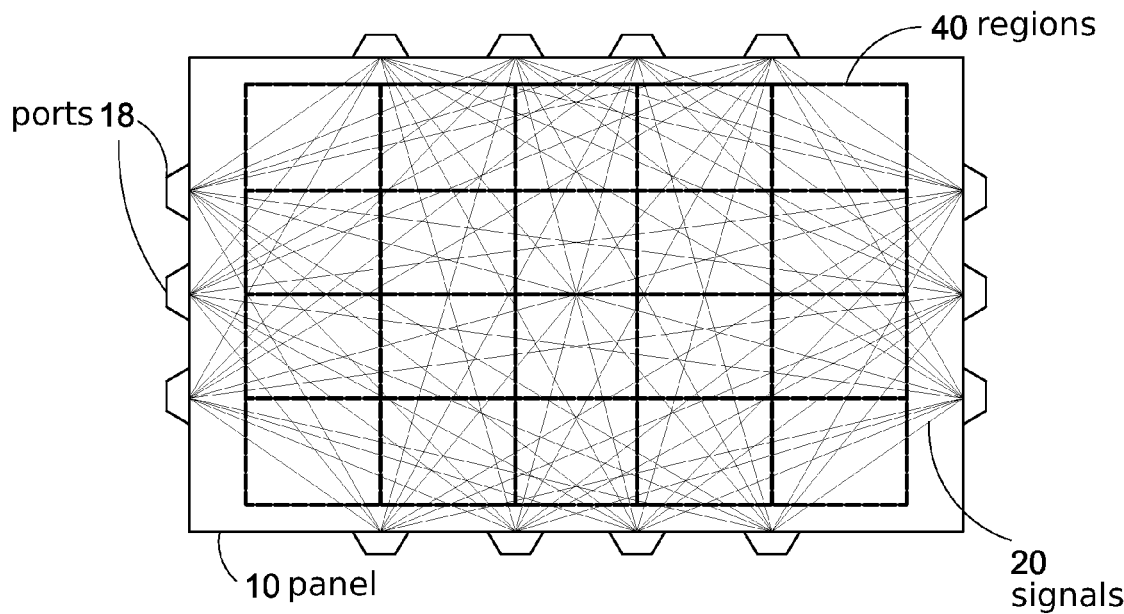
FIG. 4B shows a very useful way of defining geometries for the tomograph.

FIG. 4A (top view) is a quite unuseful way of define regions 40 and port 18 locations. If all emitter 34 ports 18 are disposed just on the left of a square panel 10, all detector 32 ports 16 disposed just on the right, measurements done along just horizontal paths, and reconstruction regions 40 are all vertical rectangles that span from top to bottom, the two dimensional reconstruction that could be done would not produce very interesting results. This example shows that some awkward ways of defining geometries lead to difficulties on tomographic reconstruction. Anyways, the most intuitive and easily defined geometries lead to good results. For example, as shown in FIG. 4B simply disposing alternating emitter and detector ports around the panel, measuring from a substantial subset of the possible emitter-detector pairs, and selecting a pixilated grid for the reconstruction regions in an amount in quadratic relation with number of emitters and detectors, good results can be achieved Step S3 is for defining a sequence of emission patterns, where the sequence typically contains a linear independent set of emission patterns, for example, the activation in sequence of just one emitter. Another set of patterns may include patterns interpreted as a matrix that has a substantially high rank so different emission patterns can be discriminated. Matrix rank is well known to those of ordinary skill in the art. Another example of patterns can be Code Sequences as normally used for CDMA (Code Division Multiple Access), a well known technique for multiplexing. The objective is to permit multiplexing and adequate discrimination of the different patterns.

Step S4 is for defining for each emission pattern a set of associated detector ports. Once an emission pattern is active, the signal reaches a set of detector ports and some of them are selected for measurement. The set of ports associated with an emission pattern may be selected taking into account the level of the signal normally received.

Step S5 is for taking a reference unreconstructed tomogram that will be used as reference to calculate the differences on conductivity when any touch is occurring. The panel has default conductivity when no touch is affecting its conductivity, and the measurements are for determining the changes produced by touch interactions.

Step S6 is for calculating the system matrix A, assuming a linear model of the tomographic system. A possible way of calculating the system matrix to be further used to calculate the tomogram may be by making X an identity matrix, on equation AX=B, being B a matrix of measurements, a set of unreconstructed tomogram acquisition. So if X is the identity, thus A=B, thus the way of calculating A may be to touch in sequence each reconstruction region with corresponding shape and "unit pressure", and measuring in each touch step the projection, so to construct B, and thus this set of measurement results in the system matrix A. This procedure, as explained above, will be readily evident to a person of ordinary skill in the art.

Step S7 is for calculating its pseudoinverse A' by using a Truncated Singular Value Decomposition (TSVD) algorithm. A typical algorithm for pseudoinverse calculation is provided by the function pinv of the MATLAB™ software from Math-Works, Inc. The parameter that controls the truncation may be used to adjust the results provided by the reconstruction algorithm, for example to make a better estimation of the conductivity values by reducing resulting reconstruction noise by the use of that truncation parameter. A way of estimating the truncation parameter may be to simulate the system with respect to its noise performance, and optimizing the parameter trying to minimize the noise figure.

The definition of parameters for tomographic reconstruction, that includes the definition of regions, position of ports, and sequence of emission patterns with its associated detectors, needs to be selected in a way to permit adequate reconstruction. A way of evaluating suitability of parameters, is by calculating the associated system matrix A, assuming a linear model of the tomographic problem, and then evaluating characteristics of the matrix A. For example, a criterion could be to evaluate if the matrix rank is close to number of defined regions, and with a condition number that characterizes a "well-conditioned" problem. If after evaluating suitability of tomographic parameters, they don't meet the defined criteria, the parameters can be redefined until the criteria are met. For example, less and bigger regions may be defined. Conditions number, rank, and matrix conditioning are concepts well understood to those skilled in the art.

Step S8 represents the actions of a user that perform control operations through one or more touch interactions that can occur simultaneously over the sensitive surface.

Step S9 is for initializing a vector b for holding the posterior acquired unreconstructed tomograph.

Step S10 is for energizing emitter ports by configuring the pattern controller with an emission pattern. In each step of the loop, each emission pattern is selected, in sequence, from the set of defined emission patterns and applied.

Step S11 is for measuring the signal levels reaching the set of detector ports associated with the active emission pattern. To measure signal levels having some rejection to possible interfering signals, for example external light on the optical embodiment, a double reading can be done. For example, the signal levels reaching detectors with all emitters off can be subtracted from the value measured when emission pattern is active.

An embodiment can discard some of the acquired values with a criterion, or just not measure the value. For example, emitting from a determinate emitter and measuring from a detector in close proximity, may be of little use. Other criteria to discard measurements may include discarding emitter-detector combinations that involves a weak signal between them, because, for example, their relative angle of incidence. Most emitters and receivers respond weakly to signals at high angles with respect to the perpendicular. Also, the measured values can be weighted by associating weighting factors with each measured value, being that operation useful to reduce overall reconstruction noise.

Another criteria for discarding the measurement of a signal associated with a determinate emitter-detector (or ports) pair, is like this: discard the measurement if no touch interaction over the defined reconstruction regions can alter significantly the signal associated with that pair. To determine whether a touch interaction can alter significantly the signal associated with that pair, a model of the system and computer simulation can be applied in a way those skilled in the art will know how to implement. A map of the "always discard" emitter-detector (or ports) pairs can be determined at factory and stored on the device for latter recall.

Yet another criteria of discarding a measurement associated with an emitter-detector (or signal flow port) pair is as follows: if the previous measurement associated with the same emitter-detector pair was utilized in a corresponding tomographic reconstruction, and that previous measurement is of a value "not far" with respect with the subsequent measurement value corresponding with that emitter-detector pair where the associated subsequent tomographic reconstruction is going to be calculated, then the previous value can be used instead of the subsequent value for the subsequent tomographic reconstruction, being the "not far" criteria whether the absolute value of the difference between previous and subsequent value is below a predetermined threshold associated with that emitter-detector pair.

That threshold value can be selected as near to the peak values generated just by expected noise or alternatively at some number of "sigmas" with respect of the expected distribution of that values generated just by expected noise. The peak values and/or the distribution of the values generated just by expected noise, can be calculated in a way those skilled in the art will readily know, for example at factory making the device to acquire data under a situation of unchanging interactions (such as no interaction) and determining the peak values and or the distribution of that values by analyzing the acquired data.

Note that the threshold for the noise-gate algorithm can be set to zero in order to always take the subsequent values instead of the previous ones. A vector of binary values, associated with the tomogram to be calculated, can hold for each index of the involved vectors, whether a previous value was used instead of the subsequent one.

The result of the combination of previous measurement with subsequent measurement as described, can be used as the input value for the Step S12.

Step S12 is for subtracting to this value, the corresponding reference values taken from vector b0. So when no touch is active, the resulting value will be zero plus the possible measurement noise. And in Step 13, the obtained values are appended to the vector b. As shown on Step S14, the steps from S10 to S13 are repeated until unreconstructed tomograph is completely acquired.

Step S15 is for preprocessing the unreconstructed tomogram, for example to linearize it by applying for example a nonlinear operation, in a similar way that most X-ray tomography devices first apply a logarithm to linearize the cumulative effect of successive attenuations that tissue imposes to X-rays.

Figure 14:
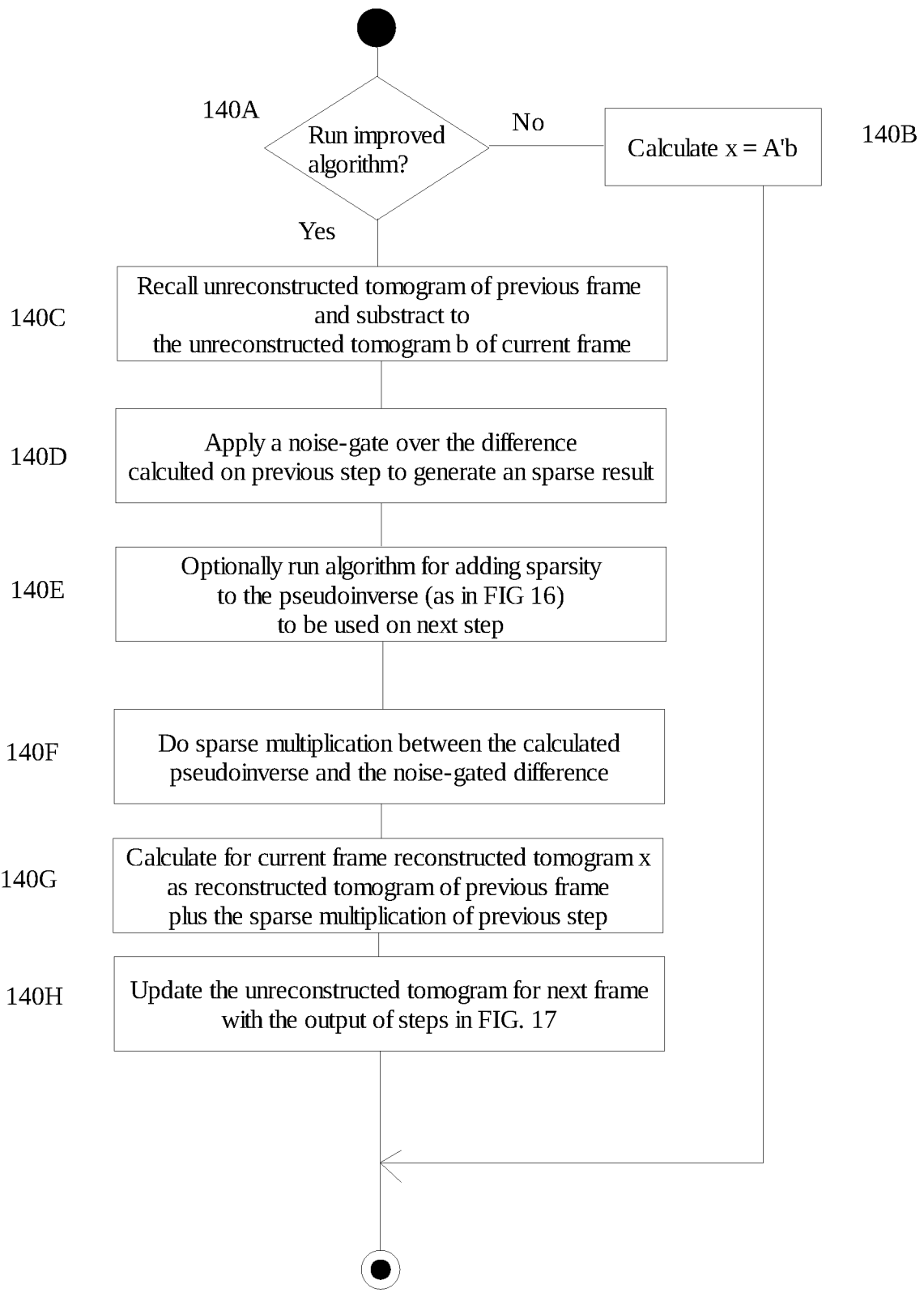
FIG. 14 illustrates a flow chart showing an example embodiment for the reconstructed tomogram calculation of time-varying signals.

Step S16 is for calculating the reconstructed tomogram x as depicted in FIG. 14, where a decision (lets call it "improvement decision") is made: if it was constructed the vector holding binary values for discrimination of whether a previous value was selected instead of a subsequent one, and the values of the vector holds data that represents a high count of occurrences of "subsequent" value selections, the described "improved algorithm" for tomographic reconstruction can be executed. The count of occurrences for taking the decision of executing the improved algorithm can be as little as one occurrence, or another predetermined value that decides whether the improved algorithm normally run faster that a non-improved algorithm (and how the occurrence count affects execution time can be tested at factory, selecting then the value that optimizes execution time, and stored that determined count as default value on the device). Alternatively, the improvement decision can be taken ignoring the occurrence count so the improved algorithm always run instead of the non-improved one.

Then variable f0_sub_x as it was calculated after all updates of its elements, can be used as the variable "x" representing the reconstructed tomogram for the next step. If on the contrary, the "improvement decision" is taken so to execute an standard tomographic reconstruction algorithm, it can be carried out, by solving the equation $x=A'b$, where $A'$ is the pseudoinverse of system matrix and b is the unreconstructed tomograph.

Step S17 is for post processing the reconstructed tomogram, for example with a noise gate that assign zero to values that are below some threshold. The threshold can be set just above normal peak noise values.

Step S18 is for recognizing touch interactions taking into account the reconstructed tomogram and generate touch events. To recognize events, a set of previously acquired tomograms may be also used. Algorithms of recognition of touch events and gestures are well known in the art and are sometimes called "blob tracking and detection", and may be based on algorithms such as the Watershed algorithm. The kind of events recognized can be a new touch appearing, a touch disappearing, an existing touch moving, or other gestures. A gesture can be a "pinch" gesture that is produced by touching the panel in two locations, and separating apart the fingers. That pinch gesture can be used for example to control the zoom factor in a map application. A touch event can be associated with a coordinate that can have more resolution than the provided by the reconstructed tomogram. A set of values around an area where the touch is occurring, can be processed to obtain a sub-pixel coordinate. For example, having a 3×3 pixels area, the coordinate of each pixel center on that area can be averaged by weighting its coordinate with the value associated with each pixel, obtaining a coordinate similar to each pixel but with sub-pixel resolution.

Alternatively, another embodiment of the touch device operations may skip touch the events detection and generation, transforming the reconstructed tomogram by DSP (Digital Signal Processing) algorithms or other methods to control the output device. For example the output device may be a sound generation device. The application to be controller may be a synthesizer, using touch interactions to alter synthesizer parameters. As an example, interactions on the horizontal axis may be mapped to pitch and interactions on the vertical axis, to harmonics levels, thus forming a multi spectral instrument.

Step S19 is for modifying the state of a user interface program in response to the touch events. For example if the user interface has a model of a virtual button, that button state becomes active if a touch interaction is detected on the area within the virtual button perimeter.

Step S20 is for generating the output information representative of the altered state of the UI (User Interface) program. For example, in the virtual button case, the output information is one that maps to different colors according to the button activation state.

Step S21 is for showing output information on the display adapted to that information through a transparent implementation of the touch sensitive panel.

Finally, the output of Step 21 is passed to Step 22, which is the user interface receiving feedback of the touch control operations. The user sees the results on the display. Further interactions from the user can be processed by repeating steps from S8 to S22.

Figure 10A:
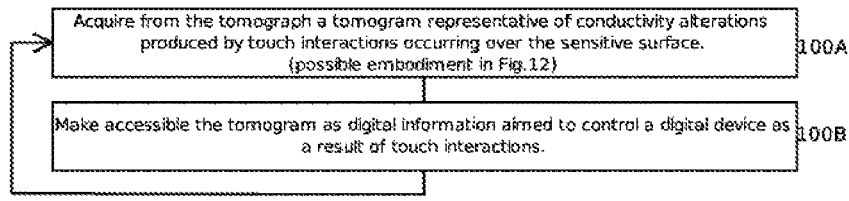
FIG. 10A illustrates a flow chart of the tomographic touch sensor operation.

FIG. 10A illustrates a flowchart of tomographic touch sensor operation. In step 100A a tomogram representative of touch interactions over the sensitive surface of the panel is acquired from a tomograph, using as an example the embodiment in FIG. 12. In step 100B the tomogram output of step 100A is made accessible as digital information used to control a digital device as a result of the touch interactions.

Figure 10B:
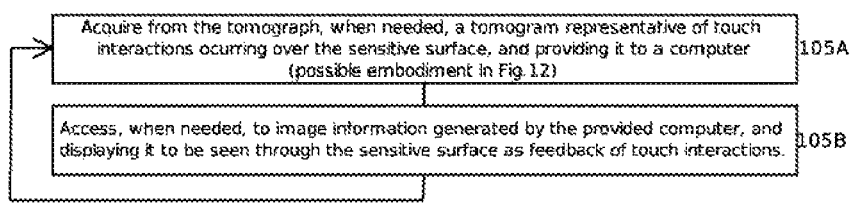
FIG. 10B illustrates a flow chart of the tomographic touch screen operation.
Figure 12:
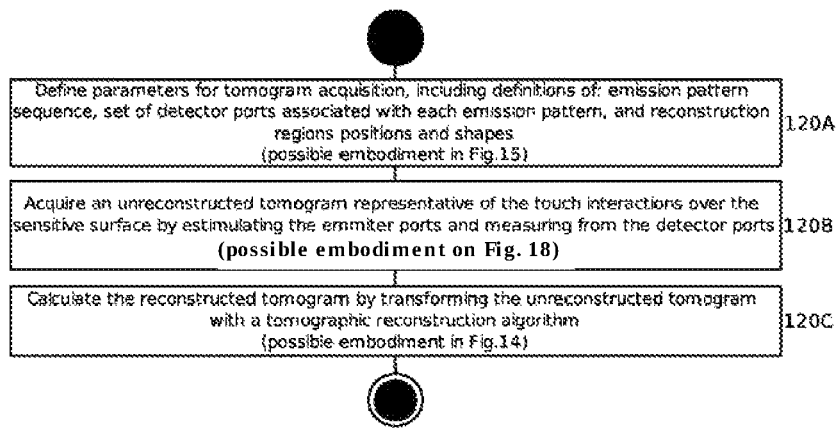
FIG. 12 illustrates a flow chart showing an example embodiment for the acquisition of a tomogram representative of touch interactions.

FIG. 10B illustrates a flow chart of tomographic touch screen operation in which step 105A acquires, when needed, a tomogram representative of touch interactions over the sensitive surface from a tomograph and provide it to a computer using possible embodiment in FIG. 12, and in step 105B access, when needed, image information generated by the computer, and display result, to be seen through the sensitive surface as feedback of touch interactions.

Figure 11:
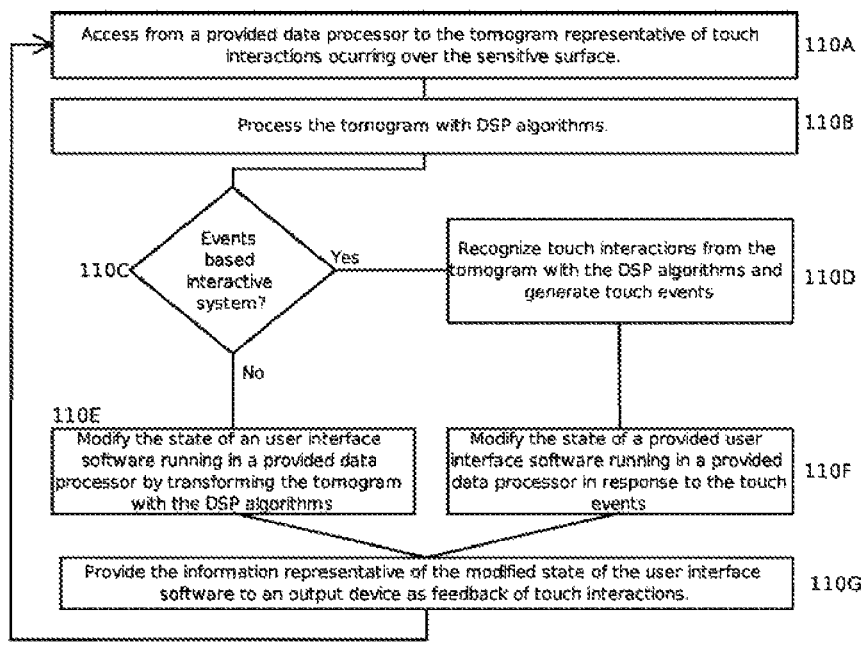
FIG. 11 illustrates a flow chart of the interactive system using a tomographic touch sensor, a data processing element, and an output device.

FIG. 11 is a flow chart of an Interactive system using a tomographic touch sensor, a data processing element, and an output device. In step 110A a data processor accesses the tomogram representative of touch interactions produced by a user over the sensitive surface. In step 110B the tomogram is processed with DSP algorithms. In step 110C a decision is taken whether it is an events-based interactive system? If YES, the program advances to step 110D where touch interactions from the tomogram are recognized and touch events are generated. In step 110F, the touch events in step 100D are received and a user-interface software program running in the data processor modifies is state in response to the touch events. If NO, the program advances to step 110E where a user-interface software program running in the data processor transforms the tomogram and modifies its state. The output of steps 110E and 100F feed to step 110G where the user interface software provides information representative of its modified state to the output device as feedback of the touch interactions.

FIG. 12 is a flow chart showing an example embodiment for the acquisition of a tomogram representative of touch interactions. In step 120A, parameters are defined for tomogram acquisition, including emission pattern sequence, set of detector ports associated with each emission pattern, and amount, position and shape of each reconstruction region, using possible embodiment in FIG. 15. In step 120B an unreconstructed tomogram representative of the touch interactions over the sensitive surface is acquired by estimating and measuring the ports around the sensitive surface, according to FIG. 18 In step 120C the reconstructed tomogram is calculated by transforming the unreconstructed tomogram with a tomographic reconstruction algorithm, using possible embodiment in FIG. 14.

Figure 13:
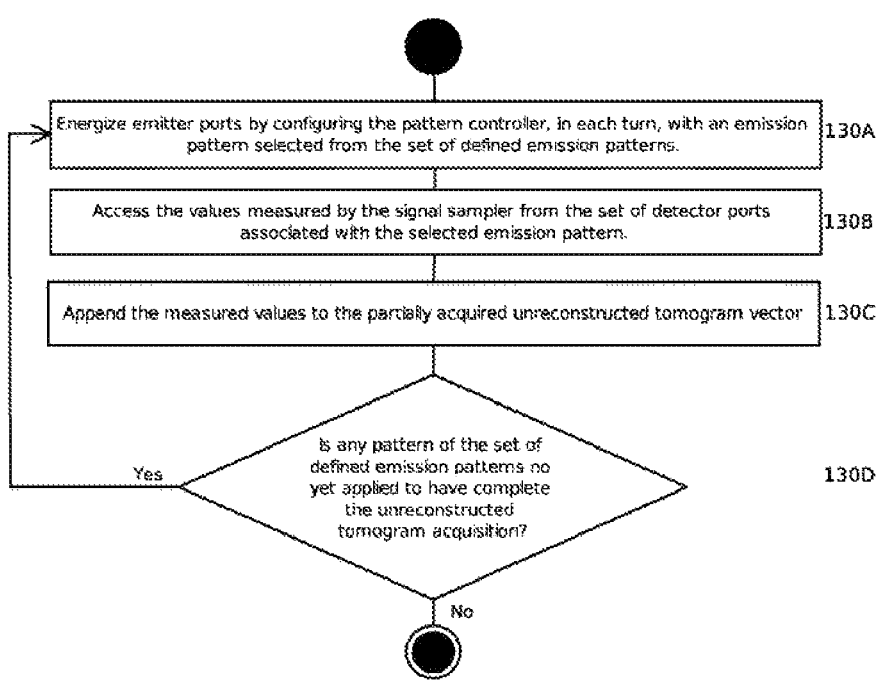
FIG. 13 illustrates a flow chart showing an example embodiment for the acquisition of an unreconstructed tomogram representative of touch interactions.

FIG. 13 is a flow chart illustrating an example embodiment for the acquisition of an unreconstructed tomogram representative of touch interactions. In step 130A configure a pattern controller with an emission pattern selected in turns from the set of defined emission patterns to energize emitter ports. In step 130B access through a signal sampler, to the measurement values from the set of detector ports associated with the selected emission pattern. In step 130C append the measurement values to the partially acquired unreconstructed tomogram. The output is put to a decision in step 130D regarding is any pattern of the set of defined emission patterns not yet applied to have complete the unreconstructed tomogram acquisition? If YES, then the program jumps or loops back to step 130A; if NO, the program outputs.

FIG. 14 illustrates a flowchart for an example embodiment for the reconstructed tomogram calculation for time-varying signals.

In step 140A a decision is taken whether or not to run the improved algorithm? if NO step 140B is executed to generate reconstructed tomogram by calculating $x=A'b$; if NO a group of steps from 140C to 140D are run. In step 140C it's calculated the difference between current and unreconstructed tomogram of previous frame. In step 140D a noise-gate is applied over the difference to generate an sparse result. In step 140E an algorithm is optionally run for adding sparsity to the pseudoinverse (as carried by the steps of FIG. 16) to be used on next step (a previously saved copy of the original untouched pseudoinverse is always recalled prior to this step). In step 140F a sparse multiplication is done between the calculated pseudoinverse and the noise-gated difference. In step 140G it's calculated for current frame the reconstructed tomogram x as reconstructed tomogram of previous frame plus the sparse multiplication of previous step. In step 140H unreconstructed tomogram data for next frame is updated according to algorithm of FIG. 17.

Figure 15:
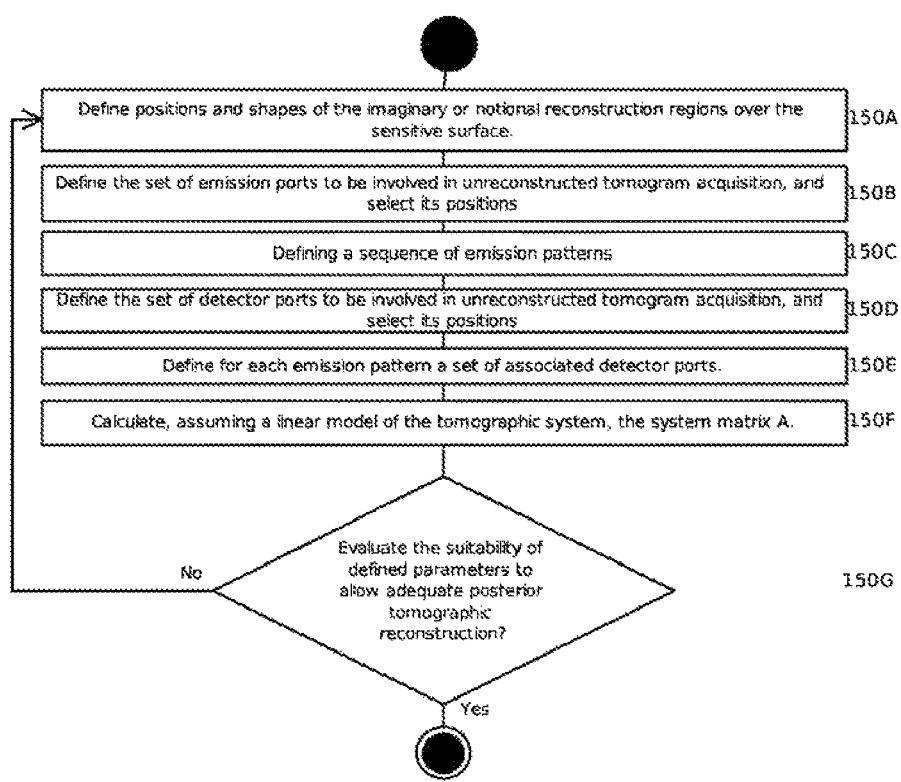
FIG. 15 illustrates a flow chart showing an example embodiment for the definition of parameters for tomogram acquisition.

FIG. 15 illustrates a flowchart of an example embodiment for the definition of parameters for tomogram acquisition. In step 150A the amount, positions, and shapes of imaginary or notional reconstruction regions on the sensitive surface are defined. In step 150B amount of emission ports to be involved in unreconstructed tomogram acquisition is defined, and positions selected. In step 150C a linearly independent set of emission patterns is defined. In step 150D amount of detector ports to be involved in unreconstructed tomogram acquisition is defined, and positions selected. In step 150E for each emission pattern a set of associated detector ports is defined. In step 150F the system matrix A is calculated assuming a linear model of the tomographic system. The output of step 150F is passed to a decision in step 150G, namely, is the rank and condition number of the system matrix A enough to allow an adequate posterior reconstruction? If the answer is YES, the signal is output; if the answer is NO, the signal is looped back to step 150A.

Figure 16:
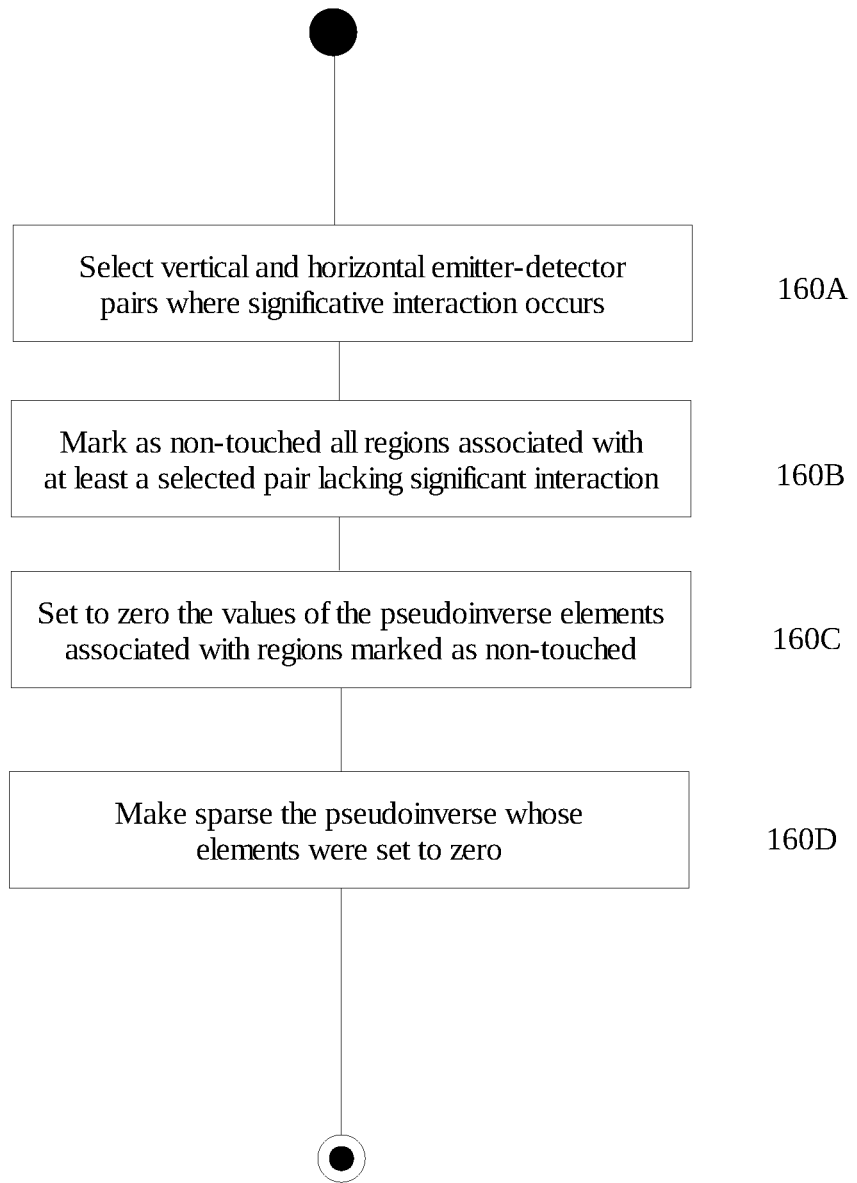
FIG. 16 illustrates a flow chart showing an example embodiment for adding sparsity to a pseudoinverse to be used for reconstructed tomogram calculation.

FIG. 16 illustrates a flow chart showing an example embodiment for adding sparsity to a pseudoinverse to be used for reconstructed tomogram calculation. Step 160A selects vertical and horizontal emitter-detector pairs where significant interaction occurs. Steps 160B marks as non-touched all regions associated with at least a selected pair lacking significant interaction. Step 160C Sets to zero the values of the pseudoinverse elements associated with regions marked as non-touched. Step 160D makes sparse the pseudoinverse whose elements were set to zero.

Figure 17:
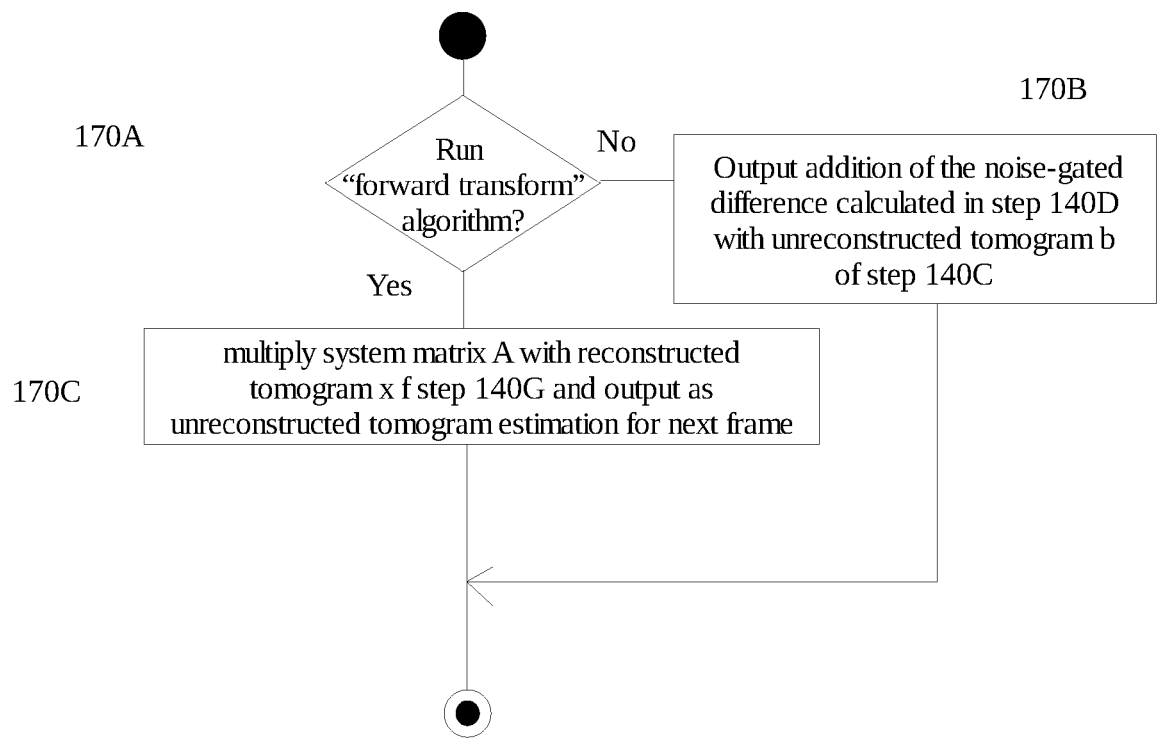
FIG. 17 illustrates a flow chart showing an example embodiment of an algorithm for estimating an unreconstructed tomogram.

FIG. 17 illustrates a flow chart showing an example embodiment for calculating an estimation of unreconstructed tomogram data, where a decision is made in step 170A, is running the "forward transform" optimization selected? if NO in step 170B the unreconstructed tomogram for next frame is updated by adding the noise-gated difference, if YES, in step 170C the unreconstructed tomogram data for next frame is estimated by an inverse of the tomographic reconstruction algorithm implemented by multiplication with the system matrix.

Figure 18:
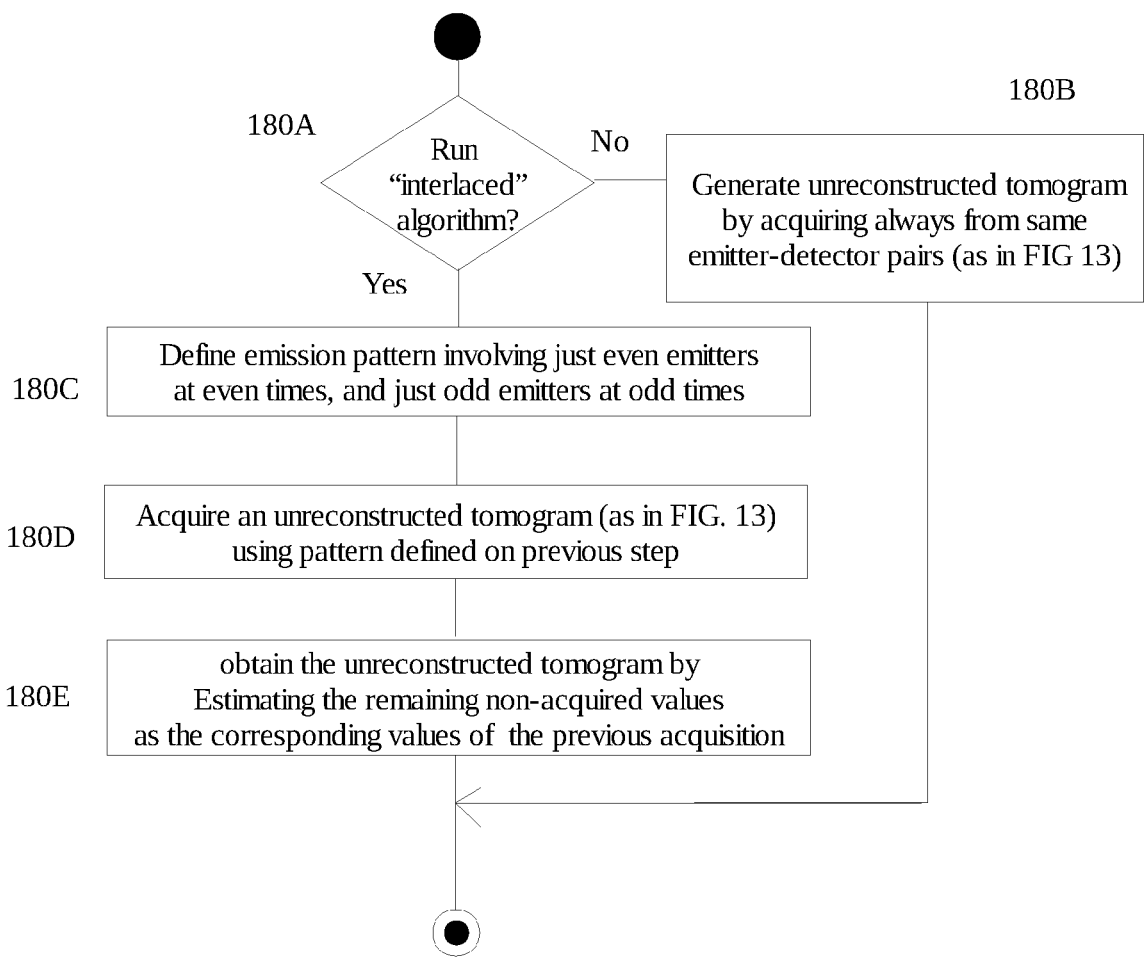
FIG. 18 illustrated a flow chart showing an example embodiment for interlaced acquisitions of unreconstructed tomograms.

FIG. 18 illustrates a flow chart showing an example embodiment for unreconstructed tomogram acquisition where a decision is made in step 180A, is running interlaced algorithm selected? if NO in step 180B the unreconstructed tomogram acquisition is carried out as in FIG. 13 if YES, step 180C defines a set of emission patterns that selects just even emitters at even times, step 180D is for performing acquisition as in FIG. 13 with just the selected emitters, in step 180E the unreconstructed tomogram is built as a mix of the recently acquired and previously acquired data associated with non-selected emitters.

Detailed Implementation of a Preferred Embodiment

A preferred mode contemplated for practicing the present invention, as of the filing of this application, is an interactive system with the optical FTIR (Frustrated Total Internal Reflection)-based embodiment. This embodiment permits the use of a panel with almost perfect light transmission properties, the detection of touch interactions with zero-pressure and also with above-zero pressure, and the use of a very low-cost panel, and other manufacturing advantages, like ease of mounting. This embodiment is detailed as follows.

A conventional LCD display is used as an output device. On top of the display, there's a clear panel made of a sheet of acrylic of less than a few millimeters thick, where infrared light passes from the borders. The objective is to make the screen visible through the panel. The panel is in mechanic contact with the screen by using two-sided tape put on the borders of the screen top, out of its active visible area. To prevent the display making unwanted TIR effect frustration on the panel's bottom surface, the tape is reflective or mirror-like. The tape is thick so if mechanic deformation occurs when pressure is applied with the fingers, the panel doesn't touch the screen. The panel shape is similar to a rectangle, but octagonal with short diagonal corners similar to the panel shown on FIG. 5A. The panel borders are unpolished so to prevent total reflections on the borders and also to provide some diffusion when light enters or exits the panel's border.

Surrounding all panel perimeter, there are infrared LEDs used as emitters and photo transistors used as detectors, touching the panel' borders, so infrared light can enter and exit from the panel. The LED and photo transistors are alternating, each emitter between two detectors and vice versa. The emitters and detectors are spaced apart at regular intervals on each panel edge, separated by about one millimeter. The emitters and detectors are soldered on different Printed Circuit Boards, one for each panel edge.

The emitters and detectors are disposed in a way that also, on opposing edges of the panel (let's assume the panel is flat) there is a equal number of emitters and detectors, and where an emitter is in one of the edges, there is a corresponding detector in the opposing edge facing the corresponding emitter (that means both positioned on a imaginary line defined orthogonal to the edges where respectively the emitter and corresponding detector are positioned, in a way that the line passes over both the emitter and detector). Note that with this distribution of emitters and detectors, the emitter and detector facing to each other on the vertical or horizontal line are also the nearest ones when the emitter is in a edge and the corresponding detector is in the opposed one.

The emitters are connected to a circuit that works similar to a LED Matrix controller that permits to activate any LED. The possible activation levels for each LED are two: no current or the maximum current allowed for the emitters. Taking into account each LED is active just a short period of time, more than the nominal continuum rate of emission is possible, like in conventional LED Matrices.

The photo transistor detectors have infrared filters matching the emission spectrum of emitters. Each phototransistor makes its current flow through a resistance to convert the current in voltage. The detectors are grouped in groups of eight elements, and each group connected to an 8-to-1 analog multiplexer.

Each analog multiplexer is associated with a 14-bit Analog to Digital Converter (ADC), and each digital output of the ADCs are connected to a digital multiplexer, so each ADC conversion value can be addressed. The digital multiplexer is a bus-based one, so each non-selected ADC is in high impedance state while the addressed one ADC is in low impedance with respect to the bus.

The LED matrix controller and the digital multiplexer are connected to a FPGA that controls them and is able to execute a Tomographic Reconstruction Algorithm.

The FPGA is connected to a CPU adapted to be able to run an application with a User Interface. The CPU is also connected to the display.

On the panel's top surface a pixilated matrix is defined. The total area matches the screen's visible area. The pixels are square with a side size matching emitter and detectors separations. A vector representing an unreconstructed tomogram is acquired by energizing in turn each emitter, and while each emitter is active, taking a measurement from all detectors. To optimize acquisition time, all ADC are commanded in parallel to take the measurement using a selected multiplexer channel, repeating this for the eight acquisition channels. The measurements are sent to the FPGA through the bus.

A further restriction applied in this particular embodiment for defining the position of the pixels representing the reconstruction regions, is to position each pixel so a imaginary vertical line passing over the centroid of the pixel also passes over an emitter and a detector, and for the same pixel another imaginary line but horizontal in this case also passes over an emitter and a detector. That way maximizes the possibility that the signal associated with that emitter and detector pair will be strongly altered in the presence of an interaction in that region, qualifying as "strongly" taking into account that emitter and detector are facing to each other more directly than a substantial number of other emitter-detector pairs.

Each time an emitter is energized and measurements are taken, another set of measurements is taken but with all emitters deactivated. This measurement is to read ambient light interference level to be subtracted from the measurement with the emission pattern active. That measurement is taken many times because ambient light can be varying, for example most light bulbs oscillates at 120 Hz. To estimate the interference level at the time of measurement with the emitter active, an average with previous and past interference measurement is calculated. This takes into account the fact that photo transistors are not as fast as other optoelectronic devices like PIN photo diodes, so before measurement a delay is inserted to account for phototransistor time response.

With the tomogram acquisition as described, a base measurement representative of the tomogram acquired when no touch interactions occurs, is taken at factory and stored with the device on a provided memory. That base measurement is called b0. This measurement is taken in every touch device produced, to account possible variations on each specific device properties. For example, not all LED in a batch produces the same level of light emission for same conditions. So this measurement accounts for that possible variation.

A linear model of the tomographic system is assumed. The system matrix A is also calculated at factory by methods used to achieve Algebraic Reconstruction Methods. Each column of matrix A is the unreconstructed tomogram taken when a determinate "unity" touch interaction is in effect. This unreconstructed tomogram is the change with respect to the base tomogram b0. The "unity" touch interaction is an interaction in a determinate region with a shape and position in accordance with that region. Columns of matrix A are representing each reconstruction region. Each "unity" touch interaction can be made by actually touching the panel with a mechanic arm, or by simulating the effect. Those skilled in the art will know to simulate the effect but a method is proposed anyways. Since the rows of system matrix A represents a determinate pair of emitter-detector, for each emitter-detector pair, the row represents all regions associated with that pair. The regions correspond to a pixilated grid and each region has an associated coefficient, so it can be viewed like a 2D grayscale image canvas. To calculate each coefficient, an anti aliased "white" line is drawn between the emitter and detector on a "black" background, taking into account emitter and detector coordinates. White corresponds to value 1 and black to 0. The "gray" level of each canvas pixel is then associated with the row coefficient. Then each row coefficient is multiplied with the value of the corresponding pair from base tomogram b0, to account for actual signal levels involved on the specific device implementation. A rectangular system matrix A is used with more columns that rows, so more measurements are taken than the amount of regions. More measurements than regions are useful to have more precision on tomographic reconstruction. It should be noted that on all steps for tomographic reconstruction, information associated with some pairs of emitter-detector are not taken into account. Some are discarded according to the following criteria: if the dot product of corresponding row on A matrix is below a threshold. The threshold is selected in a way that the rank of A matrix isn't much below region count.

Note that for many possible implementation of the device, such as an optical one, the system matrix may contain lots of zero entries (or of significant low value regarding the histogram of possible values) so the system matrix may be more efficiently stored as an sparse one.

Having the system matrix A, a pseudoinverse A' is calculated by the Truncated SVD (Singular Value Decomposition) method, by using MATLAB™'s pinv function. The tolerance parameter is calculated as follows. A value, say 1, is selected. Then by computer simulation, the reconstruction noise for a set of simulated touch interactions is calculated. Based on the noise properties of simulation results for each region, the value is lowered or incremented, so an optimization algorithm is run. The objective is to have noise lowered and if possible equally distributed for all the regions. A practical value is sometimes around 0.4. The pseudoinverse A' is also stored on device for later recall.

Once all parameters for tomographic reconstruction are calculated, the device enters an interactive loop that runs continuously.

A tomogram b is acquired as described, with the base tomogram b0 subtracted, so if no touch interactions are occurring, the b vector contains zeros or just normal noise values.

Then an algorithm is run as described as follows: a variable for counting a "change count" variable is initialized to zero. Each element of the b vector is compared element-wise with each element of another vector representing the values of the corresponding vector utilized on the previous acquisition (being that previous vector zero-filled if no previous acquisition existed). If for each element of vectors being compared, the absolute difference between them is above a predetermined threshold, the change count variable is incremented and another vector registers the fact that for that index involved on the comparison, a significant change occurred The value of the predetermined threshold is set at factory, just below the expected peak noise value normally appearing when the absolute difference between the previous and subsequent measurement values for emitter-detector pair associated with that threshold comparison, being the normal situation that of the device not being touched. After comparison involving all elements of the b vector, a decision is taken regarding the value of the calculated change count.

If the change count is greater than a predetermined maximum count, a non-improved algorithm is run as described as expressed as follows paragraph: A reconstructed tomogram x is calculated by solving the equation x=A'b on the FPGA, by techniques well know to those skilled in the art. The reconstructed tomogram, as represented by vector x, is interpreted as an image representing touch interactions, with each pixel corresponding to each reconstruction region. If on the contrary, the change count is not greater than a maximum count, an improved algorithm is run.

The mentioned predetermined maximum count for selection between improved and non-improved algorithm is calculated at factory as follows: The improved and non-improved algorithms are benchmarked with a set of input data calculated so the calculation of the change count goes from 0 to maximum the number of elements of the corresponding vectors, and then the maximum count is selected as the lower value such as the non-improved algorithm executes faster than the improved algorithm.

The implementation of the improved algorithm for this embodiment is as follows: the difference between the the vector representing the current unreconstructed tomogram b and a previously calculated unreconstructed tomogram is stored in a difference vector (if there wasn't any previously calculated tomogram it assumed to be zero). Each element of the change vector is set to zero if the vector indicating where a significant change occurred determines that for that element index, a significant change didn't occurred The change vector is converted to sparse type taking into account its zeroed entries, so resulting in a noise-gated difference. Then, a tomographic reconstruction algorithm is executed over the noise-gated difference, selected between two possible algorithms depending on a configuration variable that specifies whether a "region skipping" optimization is enabled or not If "region skipping" is disabled, a reconstructed tomogram x is calculated on the FPGA as the previously calculated reconstructed tomogram plus the sparse matrix-vector multiplication of the pseudoinverse of the system matrix with the noise-gated difference.

If "region skipping" is enabled, the reconstructed tomogram x is calculated on the FPGA (where a soft-core processor is operating) as follows: A threshold associated with each emitter-detector pair (previously calculated at factory as about four sigmas the assumed normal distribution of the expected noise associated with each emitter-detector pair) is recalled. Then an "horizontal pairs" vector and a "vertical pairs" vector (previously calculated at factory, being each element of the pairs vectors that defined as the pair consisting in the emitter and it's nearest detector of the opposing edge) is recalled. A determination of which horizontal pairs and which vertical pairs has any substantial interaction, is carried by comparing the level of alteration of the signal for each of that emitter-detector pair with respect to the normal value of that signal when no interactions occurs, using the previously recalled threshold in that comparison (element-wise). Then, the system matrix A is evaluated to determine whether at least one of the element of the system matrix (associated with the horizontal or vertical pair where there is a possible interaction) is above a predetermined value, being that value a number not low regarding maximum value of the system matrix A (for example 25% of maximum value of the system matrix A).

If the system matrix contains only low values for the associated pair being evaluated, the reconstruction region under determination whether it has interactions or not, is marked as "no interaction present" (in other words since the pairs with significant interactions don't affect the region, the region is marked as with "no interaction present"). These regions with no significant interactions, are skipped of calculation on the tomographic reconstruction algorithm, by making zero the corresponding entries on a copy of the pseudoinverse matrix that's then converted to sparse-type, and as a final step for calculation of the reconstructed tomogram, to generate the x vector representing the reconstructed tomogram, the sparse pseudoinverse matrix is multiplied with the noise-gated difference tomogram vector and then the previously calculated reconstructed tomogram is added.

Then, after the calculation of the reconstructed tomogram x, a calculation of the current unreconstructed tomogram is updated in order to be used on the next difference vector calculation of the loop as follows: set each element of that vector to the value of the previously calculated unreconstructed tomogram if the change vector indicates that no significant change occurred associated with that element index, or left it unchanged otherwise.

The tomogram x is transmitted to the CPU, where it is post processed by a noise gate, thus making zero the values below some threshold. The threshold is by default fixed just above normal reconstruction noise. The default threshold value is also calculated at factory but a noise control knob is provided to the user that can run configuration software.

On the CPU, a set of current and previous tomograms are analyzed to find touch events and gestures. The software used analyzes the events by executing a Blob Detection and Tracking algorithm. The algorithm can be selected by the user with a configuration application, where adapted versions of the software TOUCHLIB and OPENTOUCH are offered as options.

After events or gestures are recognized, they are sent by TUIO (Tangible User Interface Object) protocol to applications adapted to work with that protocol. An example application is a GPS (Global Positioning System) mapping application.

The application running on the CPU generates visual information as feedback that is sent to the display to be seen through the panel by the user, thus being that visual response feedback of the control operations introduced by touching the touch device of the present invention.

Although the present invention has been described regarding several illustrative embodiments, numerous variations and modifications will be apparent to those skilled in the art that do not depart from the teachings herein. Such variations and modifications are deemed to fall within the purview of the appended claims.

What is claimed is:

1. An interactive touchscreen system comprising a conductive panel having a surface portion adapted to receive touch interactions, and a tomograph operatively connected to said conductive panel, said tomograph configured for determining conductivity of said conductive panel by generating and tomographically processing energy signals received from said conductive panel, said tomograph being further configured for updating a reconstruction image obtained from the output of a tomographic reconstruction algorithm having as an input change data having elements derived from current projection data and reference projection data each obtained from said energy signals as being subject to change due to touch at said surface portion, said reconstruction image being representative of said panel conductivity properties at locations spatially correlated to a plurality of regions notionally defined over said surface portion and therefrom indicative of said touch interactions, and said tomograph further configured for processing and outputting at each iteration of an interactive loop said reconstruction image and an indication thereof, wherein the count of elements selected as the input to said tomographic reconstruction algorithm depends on a condition evaluated during said interactive loop and which ones of said elements are selected depends on said condition evaluated during said interactive loop.

2. An interactive touchscreen system according to claim 1 wherein said tomograph is further configured for adding sparsity to said change data by selecting which values already calculated for said change data are set to zero according to said condition being evaluated in function of the reference projection data, and wherein said tomographic reconstruction algorithm is optimized for processing sparse inputs.

3. An interactive touchscreen system according to claim 1 wherein said tomograph is further configured for updating said reference projection data from a forward transform applied to the reconstruction image, wherein said forward transform corresponds to an inverse of a tomographic inverse function, wherein said tomographic inverse function corresponds to said tomographic reconstruction algorithm, and wherein said forward transform corresponds to the tomographic projection function.

4. An interactive touchscreen system according to claim 1 wherein said tomograph is further configured for skipping calculation of at least one of said reconstruction regions by said tomographic reconstruction algorithm based on an estimation for another of said reconstruction regions sharing a least one of said energy signals, and based on the reconstruction regions skipped, selecting which of the remaining energy signals corresponding to said another of said reconstruction region are selected to be further acquired.

5. An interactive touchscreen system according to claim 1 wherein said tomograph is further configured for acquiring a portion of the current unreconstructed data, selecting in said interactive loop the elements of said portion according to the time variable, and executing said tomographic reconstruction algorithm after the portion is acquired.

6. An interactive touchscreen system according to claim 1 wherein said tomograph is further configured for determining a weighting factor corresponding to each of said energy signals for being applied to corresponding elements of said change data according to the orthogonality of the respective path to at least one axis of a plane defined by the paths of said energy signals.

7. An interactive touchscreen system according to claim 1 wherein said tomograph is further configured for stopping calculations of said tomographic reconstruction algorithm based on the time used on said calculations.

8. An interactive touchscreen system according to claim 1 wherein said tomograph is further configured for taking a decision regarding which of said energy signals have the most changes with respect to reference projection data derived from a previously calculated reconstruction data.

9. An interactive touchscreen system according to claim 1 wherein said tomograph is further configured for selecting based on said change data and during the interactive loop between said tomographic reconstruction algorithm and another tomographic reconstruction algorithm.

10. An interactive touchscreen system according to claim 1, further comprising at least one printed circuit board, wherein said energy signals are received by sensors optically coupled to a face of the panel opposite and substantially parallel to the touch surface and wherein said sensors are mounted on said at least one printed circuit board.

11. A method for determining touch on a touchscreen comprising the steps of
   a. establishing a conductive panel having a surface portion adapted to receive touch interactions;
   b. coupling operatively to said touch panel a tomograph configured for determining conductivity of said conductive panel by generating and tomographically processing energy signals received from said conductive panel;
   c. deriving each of current projection data and reference projection data from said energy signals as being subject to change due to touch at said surface;
   d. deriving change data from said current projection data and said reference projection data;
   e. storing in a memory non-transitory instructions for processing a tomographic reconstruction algorithm;
   f. coupling operatively to said memory a data processor for processing said instructions and said change data to obtain a reconstruction image;
   g. updating said reconstruction image representative of said panel conductivity properties at locations spatially correlated to a plurality of regions notionally defined on said surface portion and therefrom indicative of said touch interactions; and
   h. processing and outputting said reconstruction image at each iteration of a interactive loop and providing an indication thereof, wherein the count of elements selected as the input to said tomographic reconstruction algorithm depends on a condition evaluated during said interactive loop and which ones of said elements are selected depends on said condition evaluated during said interactive loop.

12. A method according to claim 11 further comprising the step of adding sparsity to said change data by selecting which values already calculated for said change data are set to zero according to said condition being evaluated in function of the reference projection data, and wherein said tomographic reconstruction algorithm is optimized for processing sparse inputs.

13. A method according to claim 11 further comprising updating said reference projection data from a forward transform applied to the reconstruction image, wherein said forward transform corresponds to an inverse of a tomographic inverse function, wherein said tomographic inverse function corresponds to said tomographic reconstruction algorithm, and wherein said forward transform corresponds to the tomographic projection function.

14. A method according to claim 13 wherein said reference projection data is obtained with the equation b=A*x wherein A is a sparse system matrix representative of said forward projection transform, x is a previously calculated reconstruction image, b is said reference projection data, and * is a sparse matrix-vector multiplication operation.

15. A method according to claim 11 further comprising the step of skipping calculation of at least one of said reconstruction regions by said tomographic reconstruction algorithm based on an estimation for another of said reconstruction regions sharing a least one of said energy signals, and based on the reconstruction regions skipped, selecting which of the remaining energy signals corresponding to said another of said reconstruction region are selected to be further acquired.

16. A method according to claim 11 further comprising the steps of acquiring a portion of the current unreconstructed data, selecting in said interactive loop the elements of said portion according to the time variable, and executing said tomographic reconstruction algorithm after the portion is acquired.

17. A method according to claim 11 further comprising the step of determining a weighting factor corresponding to each of said energy signals for being applied to corresponding elements of said change data according to the orthogonality of the respective path to at least one axis of a plane defined by the paths of said energy signals.

18. A method according to claim 11 further comprising the step of stopping calculations of said tomographic reconstruction algorithm based on the time used on said calculations.

19. A method according to claim 11 further comprising the step of taking a decision regarding which of said energy signals have the most changes with respect to reference projection data derived from a previously calculated reconstruction data.

20. A method according to claim 11 further configured for selecting based on said change data and during the interactive loop between said tomographic reconstruction algorithm and another tomographic reconstruction algorithm.

* * * * *